(12) United States Patent
Tanabe

(10) Patent No.: US 7,677,073 B2
(45) Date of Patent: Mar. 16, 2010

(54) METHOD OF MANUFACTURING TOOTH PROFILE PART

(75) Inventor: Keiji Tanabe, Inuyama (JP)

(73) Assignee: Kondo Seiko Co., Ltd. (JP)

( * ) Notice: Subject to any disclaimer, the term of this patent is extended or adjusted under 35 U.S.C. 154(b) by 115 days.

(21) Appl. No.: 10/592,486

(22) PCT Filed: Oct. 15, 2004

(86) PCT No.: PCT/JP2004/015672

§ 371 (c)(1),
(2), (4) Date: Sep. 12, 2006

(87) PCT Pub. No.: WO2006/040840

PCT Pub. Date: Apr. 20, 2006

(65) Prior Publication Data

US 2007/0204669 A1 Sep. 6, 2007

(51) Int. Cl.
*B21D 22/00* (2006.01)
(52) U.S. Cl. .................. 72/352; 72/358; 29/893.34
(58) Field of Classification Search .............. 72/91, 72/344, 352–359; 29/893.34
See application file for complete search history.

(56) References Cited

U.S. PATENT DOCUMENTS 3,028,662 A * 4/1962 Pessl et al. ............. 29/893.3
3,841,126 A * 10/1974 Minami et al. ............. 72/45
3,974,677 A * 8/1976 Castellani et al. ........... 72/340
6,457,341 B1 * 10/2002 Wirgarth .................. 72/354.2
6,688,153 B2 * 2/2004 Kanamaru et al. ........... 72/356

FOREIGN PATENT DOCUMENTS

| JP | 61-235033 | | 10/1986 |
|---|---|---|---|
| JP | 63-112038 | | 5/1988 |
| JP | 2913522 | | 6/1993 |
| JP | 05154598 A | * | 6/1993 |
| JP | 06-079392 | | 3/1994 |
| JP | 06-226392 | | 8/1994 |
| JP | 09-085385 | | 3/1997 |
| JP | 09-220633 | | 8/1997 |
| JP | 09-276977 | | 10/1997 |
| JP | 09-300041 | | 11/1997 |
| JP | 2002-046030 | | 2/2002 |
| JP | 2002-126847 | | 5/2002 |
| JP | 2002-143978 | | 5/2002 |

* cited by examiner

*Primary Examiner*—Dana Ross
*Assistant Examiner*—Stephanie Jennings
(74) *Attorney, Agent, or Firm*—Bacon & Thomas, PLLC

(57) ABSTRACT

A method of manufacturing a part with a tooth profile by cold forging includes an initial step of forming a initial tooth profile and a finishing step of forming a completed tooth profile by sizing. Between the initial step and the finishing step, is an intermediate step tooth thickness of the initial tooth profile is either maintained or reduced by 10% or less from the tooth thickness of the initial tooth profile. In the intermediate step an addendum part is expanded beyond the initial tooth profile by cold forging.

12 Claims, 20 Drawing Sheets

(A) left tooth surface | right tooth surface (B) left tooth surface | right tooth surface (A)

left tooth surface      right tooth surface (B)

left tooth surface      right tooth surface

METHOD OF MANUFACTURING TOOTH PROFILE PART

BACKGROUND OF THE INVENTION

The present invention relates to a method of manufacturing a tooth profile part such as a gear, a sprocket gear, or a spline gear, particularly by cold forging.

PRIOR ART

A method of manufacturing a gear from a metal material by cold forging is known as shown in Japanese Patent Unexamined Publication No. 9-300041.

FIG. 1 (A) (B) show a conventional method of manufacturing a spur gear by cold forging as described in Japanese Patent Unexamined Publication No. 9-300041. A cylindrical metal preform 10 is close to a desired gear in outer diameter. A lower end of the cylindrical metal preform 10 is inserted into a bore 11A of a die 11 and pressed in a direction indicated by an arrow X. The upper end face of the metal preform 10 is pushed downward with a punch (not shown) to form a male tooth profile. The male tooth profile formed on the outer circumferential surface of the preform 10 corresponds to a tooth profile 12 of the die 11. There is a reverse relationship between a dedendum part and an addendum part of the tooth profile with respect to the preform 10 and the die 11. The tooth profile 12 of the die 11 has a normal whole depth H. Similarly, the tooth profile formed on the outer circumferential surface of the finished gear has a normal whole depth H.

In FIG. 1 (A) (B), reference numeral 13 designates a pitch circle. Reference numeral 14 designates an addendum circle of the tooth profile 12 of the die 11. Reference numeral 15 designates a dedendum circle of the same.

In the conventional method of manufacturing a gear by cold forging, the die 11 has a sloped end face 16 where the tooth profile 12 of the die 11 begins, wherein a slope angle B of the end face 16 is 30° or less with respect to a surface orthogonal to a central axis of the die 11. The smaller the slope angle B is, the less the tooth profile is incompletely formed.

Further, although the preform 10 is sometimes cold-forged in a single step, it is sometimes finished by cold forging after preforming under a hot or warm condition, annealing, and processing surface lubrication, etc.

In the conventional method of manufacturing the gear by cold forging shown in FIG. 1, quality of the finished product of the gear is considered to depend 50 to 80% on the die used for forging.

In the method shown in FIG. 1, forming is performed in a female die. Such forming is called 'in-die forming'. A metal preform to be used in such a manufacturing method is a solid round bar, a ring, or a preformed product produced by hot or warm forging, etc.

In the conventional method of FIG. 1, the gear is cold-forged in a single step to obtain the finished size. Therefore, a load (pressure) applied on the sloping surface 16 of the form starting part of the tooth profile 12 reaches no less than 200 kgf/mm² to 280 kgf/mm². 70 to 90% of the load (pressure) corresponds to a breaking strength of the die, even if the die is made of a maximum-strength material.

On the other hand, as shown in Japanese Patent No. 2913522, a method of forging a spur gear is also known, where cold forging is performed in three processing steps. Specifically, the first processing step converts the perform to a primary processed gear with a gear shape in which both an addendum and a tooth thickness are set smaller than the final tooth contour of the spur gear to be obtained. In the second processing step the primary processed gear is pressed while allowed to freely flow, except for the tooth profile, to form a secondary processed gear. The third processing step radially expands the secondary processed gear to form a finished product. A method of processing a spur gear by cold forging in each of the steps is also known.

FIG. 2 (A) to (E) show a method described in Japanese Patent No. 2913522. FIG. 2 (A) shows a die for performing the first processing step. FIG. 2 (B) shows a die for performing the second processing step.

In FIG. 2 (A), reference numeral 200 designates a die. Reference numeral 201 designates a tooth profile of the die 200. A punch 202 to be fitted with the die 200 is provided. A knockout pin 204 corresponds to the punch 202 and penetrates a through hole 203. Reference numeral 205 designates a material. Reference numeral 206 designates a primary processed gear processed by the die 200.

In FIG. 2 (B), reference numeral 210 designates a die. Reference numeral 211 designates a tooth profile of the die 210. Reference numeral 212 designates a through hole. The through hole communicates with the tooth profile 211 and penetrates the die 210. Reference numeral 213 designates a punch to be fitted in the die 210. Reference numeral 214 designates a knockout pin inserted in the through hole 212 of the die 210. In addition, reference numeral 215 designates a secondary processed gear processed by the die 200. A protuberance 216 of the material is formed within the through hole 212.

In FIG. 2 (A), the preform 205 is pressed to form the primary processed gear 206. Since the primary processed gear 206 is insufficiently filled in the die, an underfill 207 occurs. Next, the primary processed gear 206 is inserted in the die in FIG. 2 (B). The material is pressed with the punch 213 and filled on the tooth profile 211. Thus, the secondary processed gear 215 is formed.

The secondary processed gear 215 is formed by pressing with the punch 213. In the secondary processed gear 215, the material fills in the tooth profile 211, and the underfill on the addendum part is removed. This is because the protuberance 216 is formed by free flow of the material around except the tooth profile where the material is not bound during processing.

FIG. 2 (C)~(E) are figures comparing the primary processed gear 206 formed in a first processing step and the secondary processed gear 215 formed in a second processing step. A tooth profile contour 206A formed in the first processing step is set smaller than a tooth profile contour 215A formed in the second processing step both in addendum and in tooth thickness.

In the method described in Japanese Patent Unexamined Publication No. 9-300041, the maximum load during cold forging is often received on the sloping end surface 16 inside the die. Since little effort has been made for lowering the maximum load, a life of the die 11 was short. Consequently, there was the disadvantage of loss of quality of products.

Particularly, when a helical gear is manufactured by cold forging, the load tends to slope the tooth profile 12 of the die 11 to one side. Therefore, an area in the vicinity of the sloping surface 16 has often broken, thus shortening the life of the die 11.

According to the inventor's knowledge, when processing the helical gear by cold forging, the load is concentratively applied on one surface (front surface) of the tooth profile of the die, not so much on a back surface thereof. Therefore, there is a remarkable difference of the load between the front surface and back surface of the tooth profile, which causes defects in the tooth profile.

The method described in Japanese Patent No. 2913522 has problems as follows.

As shown in FIG. 2 (E), the whole shape of the tooth profile including both the addendum and the tooth thickness is formed smaller (thinner) than the contour of the finished tooth profile. Therefore, a ratio of plastic processing becomes large.

If the ratio of processing becomes large, plastic-process-hardening of the processed product advances. Further, resistance of deformation becomes large, which makes forming difficult.

Further, the shape coefficient becomes large and the forming load and distortion of the die increases. Therefore, precision of the processed product becomes low. In addition, the die easily breaks if the process speed is raised.

With regard to precision, it is preferred not to use a small tooth profile formed in the primary process in the secondary process as shown in FIG. 2 (E) because difference of the enlarging ratio between a middle part and an end surface of the face width (degree of forming) becomes larger, by enlarging a face width, for example. The tooth profile becomes uneven, resulting in poor roundness.

Particularly, the method described in Japanese Patent No. 2913522 is not appropriate for mass-producing gears with high precision.

If the forming load is raised for improving precision, distortion enlarges in the object to be processed, and distortion in after heat processing is enlarged. As the load enlarges, the die may break.

SUMMARY OF THE INVENTION

The object of the present invention is to provide a method of manufacturing an element with a tooth profile, for example a gear, by cold forging, which elongates life of the die and which produces a tooth profile of good quality.

Accordingly, the present invention provides:

(1) A method of manufacturing a tooth profile part by cold forging comprising:

an initial step of forming an initial tooth profile, a completing step of forming a completed tooth profile by sizing, and between the initial step and the completing step, maintaining a tooth thickness of the initial tooth profile substantially identical to a tooth thickness of the initial tooth profile or reducing a tooth thickness within a range of 10% or less compared to the tooth thickness of the initial tooth profile, and at the same time including an intermediate step of radially expanding an addendum part beyond the initial tooth profile by cold forging.

(2) Preferably, rounded portions on both sides of a dedendum of the initial tooth profile are larger arcs than rounded portions on both sides of a dedendum of the completed tooth profile.

(3) Preferably, the tooth thickness is maintained identically or reduced, and that at the same time the addendum part is radially expanded by plural cold forging steps to approach the shape of the addendum portion of the completed tooth profile.

(4) A guide portion may be provided at an opening of the die for finishing in the completing step, and the length of the guide part is preferably half or more of the face width.

(5) The tooth profile is preferably sized and adjusted so that the thickness will be reduced by an amount in the range of 0.02 to 0.1 mm in the completing step.

(6) The initial tooth profile may be formed by means of a parts-former in three to five steps from the initial step to the completing step, with softening or direct lubricant coating before sizing.

(7) Softening of the tooth profile may be performed between the initial step and the intermediate step.

(8) The tooth profile may be coated with lubricant between the initial step and the intermediate step.

(9) The radial expansion is stopped before an addendum part of the tooth profile of the processed product reaches an addendum part of the tooth profile of the die in each of the initial process and the intermediate process.

A preferred example of the tooth profile component is a gear, and the method of manufacturing the gear by cold forging comprises the following steps:

(1) An initial step of forming an initial processed product having an initial tooth profile by cold forging a metal preform (a solid cylinder, for example).

(2) An intermediate step of cold forging the initial processed product to maintain the tooth thickness of the initial tooth profile substantially unchanged or to reduce the tooth thickness in a range of 10% or less, and at the same time radially expanding the addendum part.

(3) A step of sizing (drawing for finishing) the tooth profile to form a completed tooth profile after the intermediate process.

During intermediate processing, the tooth thickness is not increased. During intermediate processing, the tooth thickness is either maintained substantially without change or decreased (10% or less). Thus, it is possible to perform fine forging under a lower load. As a result, it is possible to not only reduce processing pressure but also to raise processing speed.

Further, it is possible to manufacture the tooth profile element such as a gear or spline gear by cold forging (fine forging) with high precision.

If the intermediate step as described above is included, it is easy to fit the tooth profile of the processed product to the tooth profile of the die in the final step. Even if the helical gear has a large helix angle, variation in precision does not occur in the products.

Compared to the conventional method of manufacturing a gear made only by drawing, friction with high face-pressure is no longer applied on the die. Therefore, it is possible to extend the lifetime of the die. The lifetime becomes three to ten times longer than that of the die in the conventional method of drawing, for example.

It is possible to manufacture a gear having a small face width or a chain sprocket etc. by cold forging. In this case, it is possible to improve the strength and the manufacturing speed compared to the other manufacturing methods.

If the outside area in the radial direction of the metal material is thickened in the axial direction compared to the inside area, fiber flow forms along the tooth profile and it is possible to obtain a higher strength as compared to gear cutting. It does not cause the die wearing and breaking that have occurred in conventional precision shearing.

If a plurality of different dies are used to form the tooth profile step by step, its fiber flow becomes good and no cracking will occur.

If the tooth profile is formed step by step with changing of the degree of radial expansion in the intermediate step, an addendum part forms an arc shape or other curved round shape (a curved surface in which the top part thereof positions centrally) and approaches the addendum part of the completed tooth profile in the die even if the same die is used. Thus the fiber flow becomes good and cracking does not occur.

If one or more of the following steps are adopted in each cold forging step, it is possible to perform forging under a further reduced load.

(1) Lubricant coating.

(2) Softening.

(3) Adjusting the tooth profile. The tooth thickness is maintained substantially without change.

(4) Determining the size in consideration of a finishing process, if the material has a high ratio of work hardening.

(5) Determining the shape and the size except for the tooth profile so that the load will be low.

In another aspect of the present invention, the tooth profile after the intermediate step is slightly larger than the complete tooth profile in outer diameter. Thus, an accurate tooth profile is obtained upon sizing (finishing drawing) in an added step.

The processed product after the initial step is set identical to or increased 10% or less of the finished tooth profile in tooth thickness. Thus, the rounded shape of the bottom of the first tooth profile is set larger than that of the finished tooth profile. In this case, if the ratio of processing between the initial step and the intermediate step is appropriately determined, it is possible to size in the intermediate process and the completing step to obtain a desirable finished tooth profile, even if the forming pressure (forming load) is 10~50% lower.

In order to avoid an increase in the processing pressure, it is preferable not to fully fill the die, i.e. the initial step or the intermediate step, it is conducted so that a space will remain between the top of the addendum part of the tooth profile of the die and the top of the addendum part of the tooth profile of the processed product after cold forging.

Further, an addendum part of the tooth profile of the initial processing die is set substantially identical or smaller than the finished tooth profile in tooth thickness. In addition, the whole addendum part of the processed product is formed with outer surface in the shape of an arc or other curved surface (a shape in which the top lies at the center). The larger, more round shape increases the strength against breaking of the processing die.

It is possible to form the finished tooth profile in three to seven steps by means of a parts-former. In this case, it is possible to provide mass production at less cost. In the case of the helical gear, since it is possible to form the helix angle with high accuracy and good precision, it can be used as a reference plane for use in achieving precision in the finishing step which follows.

If the radial expansion of the addendum part is 60% or more of the finished tooth profile, a considerable effect is obtained.

According to the present invention, since the forging does not completely fill the die as described above, it is possible to lower the forming load. Preferably, a forging press (particularly the parts-former) is adopted as a forming machine.

The following steps allow processing under lower load in each cold forging.

(1) Lubricant coating with a molybdenum disulfide coating or bonding.

(2) Softening at 600° C.~650° C. and for 90 mim.~240 min. in the case of steel.

(3) Adjusting the tooth profile. The tooth profile remains substantially identical between the initial process and the intermediate process. The height of the addendum part (addendum), roundness of the dedendum part, and roundness of the addendum part are suitably associated.

(4) Sizing in consideration of performing an additional intermediate tertiary process in the case of the material with a high ratio of hardening in processing.

(5) Setting the shape and the size of the part except for the tooth profile.

(6) Providing a guiding part at the mouth of the die for initial processing. The length of the guiding part is set substantially identical to a face width of the processed product. A loss of the size difference between the die for the intermediate process and the die for the initial process is eliminated, thereby obtaining effective incremental radial expansion of the addendum part. Such is a practical and effective method for mass production.

Further, another preferred mode for carrying out the present invention is as follows.

(1) Pressing both ends of the gear element by means of the punch to expand the side face of the cylindrical material outwardly in such a condition that the material is inserted in the die in the initial step for forming the tooth profile. Further, it is expanded as the intermediate step, as the forming pressure is set low. Thus, precision and lifetime of the die is improved effectively.

(2) Softening and direct lubricant coating after the initial step to obtain a good surface roughness.

(3) Providing a margin for sizing (a drawing margin for finishing) in the range of 0.02~0.10 mm for each of an outer circumferential surface, tooth surface, and tooth bottom in radial expansion in the intermediate step. Depending on the situation, radial expansion may be performed three times.

(4) Sizing (drawing for finishing) in the finishing step to finish the tooth profile. The die for sizing is provided with the guiding part at the mouth of the die. A blank and the tooth surface of the die abut along the tooth trace over the whole length of the preform. Thus, it is possible to avoid distortion of the tooth trace caused by the sizing pressure. Thus, since the processing pressure necessary for finishing the tooth profile is low, the internal stress becomes small and precision becomes high.

(5) Cutting the end surface and the bore of the tooth profile. The reference surface for processing is set as the tooth surface or the tooth outline. Fillet cutting of the end corner is sometimes additionally performed.

(6) Hardening the gear by heat-treatment.

(7) Improving surface roughness and removing small fins, by barrel polishing or short peening, for example. Electropolishing or chemical polishing may be performed.

(8) Grinding the bore and the end surface of the tooth profile element. If there is no specification, grinding is unnecessary.

(9) Cleaning the tooth profile part.

(10) Rustproofing the tooth profile part (generally by applying rustproofing oil).

Such a series of the above-stated steps (1)~(10) is a typical example. The above-stated steps (1)~(4) are important.

In another mode of the present invention a metal preform with a cylindrical outer surface (a circular column, for example) is inserted into a die having a certain female tooth profile. In the die, the metal preform is expanded by a punch to form an intermediate tooth profile in cold forging.

The diameter of the cylindrical perform may be smaller than the diameter of an addendum circle of the die or smaller than the minor diameter of the gear.

It is possible to press the cylindrical perform along a central axis to push it toward the die.

It is possible to push the cylindrical perform to a support member positioned at one end by means of a pushing member provided at the other end thereof. Further, the support member and the pushing member may be formed with a tooth profile corresponding to the tooth profile of the die. The pushing member may be provided at both ends of the circular column material on the central axis.

The cylindrical perform may have a bore penetrating along the central axis in which a pin is arranged for maintaining the shape of the bore.

By means of a plurality of different dies, the tooth profile may be gradually formed depending on each die. Alternatively, by means of the same (a single) die, degrees of radial expansion of the addendum part may be varied to gradually form the tooth profile.

After the cylindrical perform is initially formed, internal stress may be removed by softening.

The initial tooth profile may be drawn for forming. The addendum part of the drawn initial tooth profile may be radially expanded in the die.

In yet another mode of the present invention, a method of manufacturing a gear by cold forging is provided. Particularly, the present invention is effective in manufacturing a helical gear. It has been understood that the helical gear is very difficult to manufacture by cold forging. However, according to the present invention, it is possible to manufacture the helical gear or gears similar to the same, effectively and with high precision.

It is possible to manufacture various kinds of gears with the method of the present invention. For example, it is possible to form a double gear having large and small gear portions, a flanged gear, a chamfer bevel gear, a ratchet gear, a gear with serration etc. by cold forging. Furthermore, it is possible to cold forge of a straight bevel gear or gears similar to the same.

In the manufacturing method according to the present invention, it is possible to set product-precision of the gear to classes 2 to 5 of the Japanese Industrial Standard.

In the manufacturing method according to the present invention, it is possible for cold forging to produce single, integral gear, even in the case of a flanged gear, double gear, or spline gear.

The present invention includes a method of finishing by cold forging after hot or warm processing and a method additionally including grinding etc. before or after or in the middle of cold forging, as needed. In other words, the present invention is not limited to the manufacturing the final gear product only by cold forging from beginning to end.

The material used in the present invention is mainly metal and is a round bar, ringed material, or preformed product made by cold forging in hot or warm conditions, etc. A preferred metal material is coil material from the viewpoint of cost. Basically, it is possible to use any materials conventionally used for gears.

Thickening of the outer circumferential portion of the element undergoing processing in advance of processing according to the present invention provides the following advantages:

(1) Fiber flow occurs along the tooth profile, thus increasing strength.

(2) Since the tooth surface is substantially identical to the die in surface roughness, surface roughness does not worsen in mass production.

(3) Precision of the die is reproduced in the gear.

(4) The post-treatment step can be identical to fine blanking.

In the present invention, 'stretching' or 'bulging' of the metal material additionally means radial expansion of the metal material. Expansion of the metal material can be paraphrased by 'Harashi' in Japanese. Since 'ejection' means forming by concentrically radially expanding the addendum part, it can be viewed as a special case of stretching (without increasing the tooth thickness).

It is possible to apply the present invention to various kinds of gears such as a spur gear or a helical gear (it is also called spiral gear or twisted gear).

It is possible to apply the present invention to a small tooth thickness or a large tooth thickness.

If the face width of the gear is relatively large and if it is difficult to obtain roundness only by radial expansion ejecting, drawing at an appropriate ratio can provide good effect. Even if the material does not have good ductility, a drawing method may be added. The processing ratio is set in consideration of the size and material.

Some preforms have no bore, while other preforms have bores before forming the tooth profile. If the material has a bore, it is preferable to arrange a mandrel pin in the center thereof. In this case, the preform with a bore should be longer than a preform without a bore. When initially radially expanding, it is possible to press both end surfaces to form the tooth profile as the bore is plastic-processed.

A method of forming the helical gear according to the present invention includes:

(1) Expanding the perform to form a helical gear in the initial step. Thus, it is possible to copy the helix angle precisely. It is possible to lower the forming pressure from the intermediate process.

(2) Softening and direct lubricant coating after the initial step. Such a step is adopted for obtaining mainly surface roughness.

(3) Drawing the processed product from the die for the initial step with rotating it along the helix angle.

(4) Inserting the processed product into the die for the intermediate step along the helix angle as rotating it to eject or protrude as the intermediate step. A margin for sizing (drawing for finishing) of 0.02 to 0.10 mm is provided on each of an outer circumferential surface, a tooth surface, and a tooth bottom. Depending on the situation, radial expansion is performed three times. After that, the processed product is drawn out of the die by rotating it along the helix angle.

(5) Sizing it so that the thickness will decrease by an amount of 0.02 to 0.2 mm to finish the helical gear. The die for sizing is provided with a guiding part at the mouth of the die. The tooth trace abuts over the whole length of the preform. Thus, it is possible to avoid distortion of the tooth trace caused by the sizing pressure. Since the processing pressure necessary for finishing the tooth profile is low, the internal stress is small and precision is high.

(6) Grinding the end surface and the bore of the helical gear. The reference surface for processing is taken as the tooth surface or the tooth outline.

(7) Hardening the gear by heat-treatment if needed.

(8) Barrel polishing or short peening in order to improve surface roughness and remove small fins. Electro-polishing or chemical polishing may be performed.

(9) Grinding the bore and the end surface of the gear. If there is no specification to be met, grinding is unnecessary.

(10) Cleaning.

(11) Rustproofing.

In all of the embodiment described above, radial expansion is preferably performed by compression in which the end surface of the preform or the intermediate product is pressed by means of the punch or the pin.

DESCRIPTION OF THE EMBODIMENTS

Various embodiments of the present invention will be described referring to the accompanying drawings.

Figure 3:
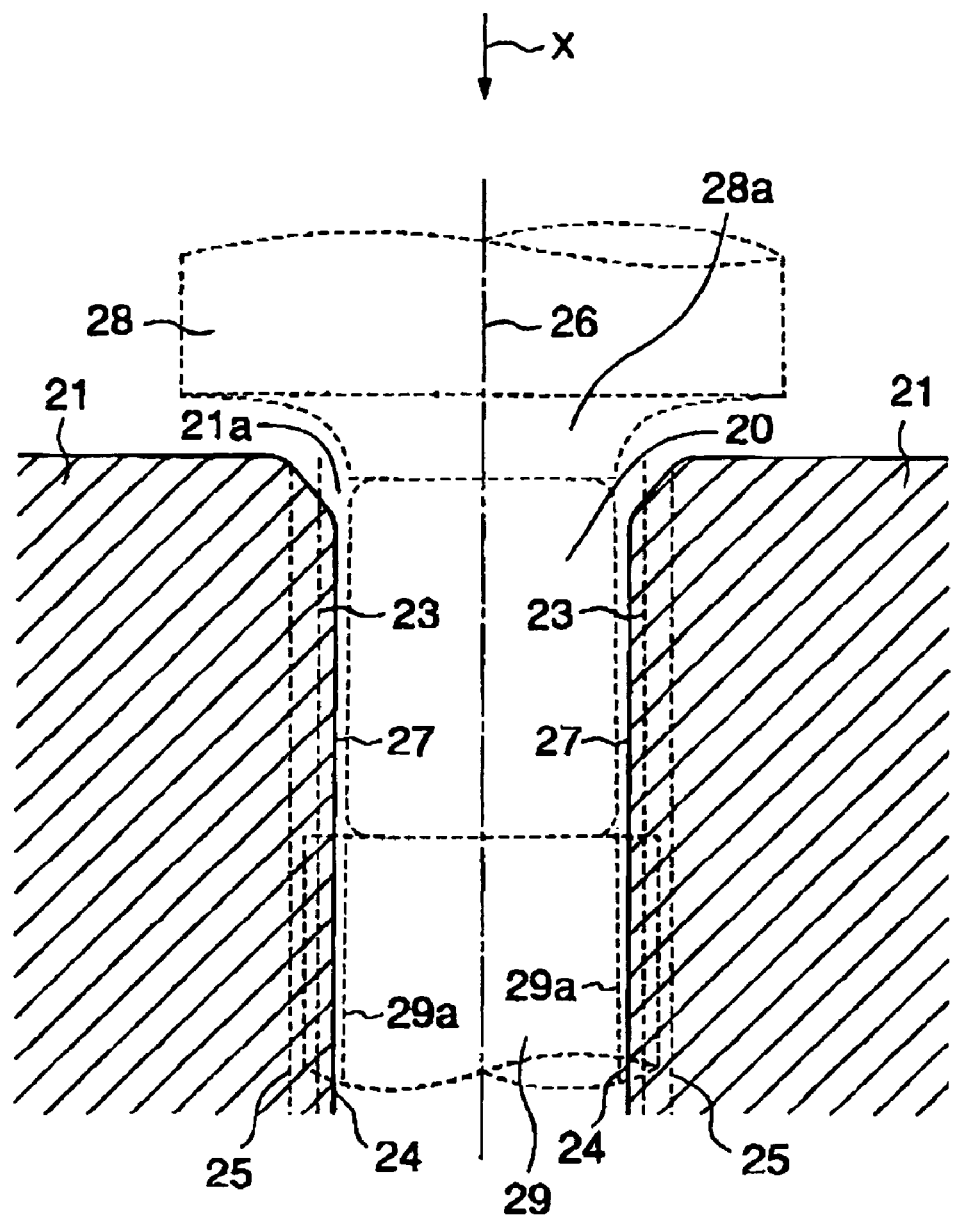
FIG. 3 illustrates one embodiment of the present invention.

Embodiment of FIG. 3

FIG. 3 illustrates one preferred embodiment of the present invention. In the embodiment of FIG. 3, a metal preform 20 is processed into a spur gear. FIG. 3 illustrates the preform before forming a tooth profile.

A die 21 has a bore 21a. The bore 21a penetrates along a shaft center 26. A female tooth profile 27 is formed on a circumferential surface of the bore 21a. The tooth profile 27 is configured as a normal spur gear. Reference numeral 23 designates a pitch circle. Reference numeral 24 designates an addendum circle of the tooth profile 27. Reference numeral 25 designates a dedendum circle of the tooth profile 27.

Figure 1A:
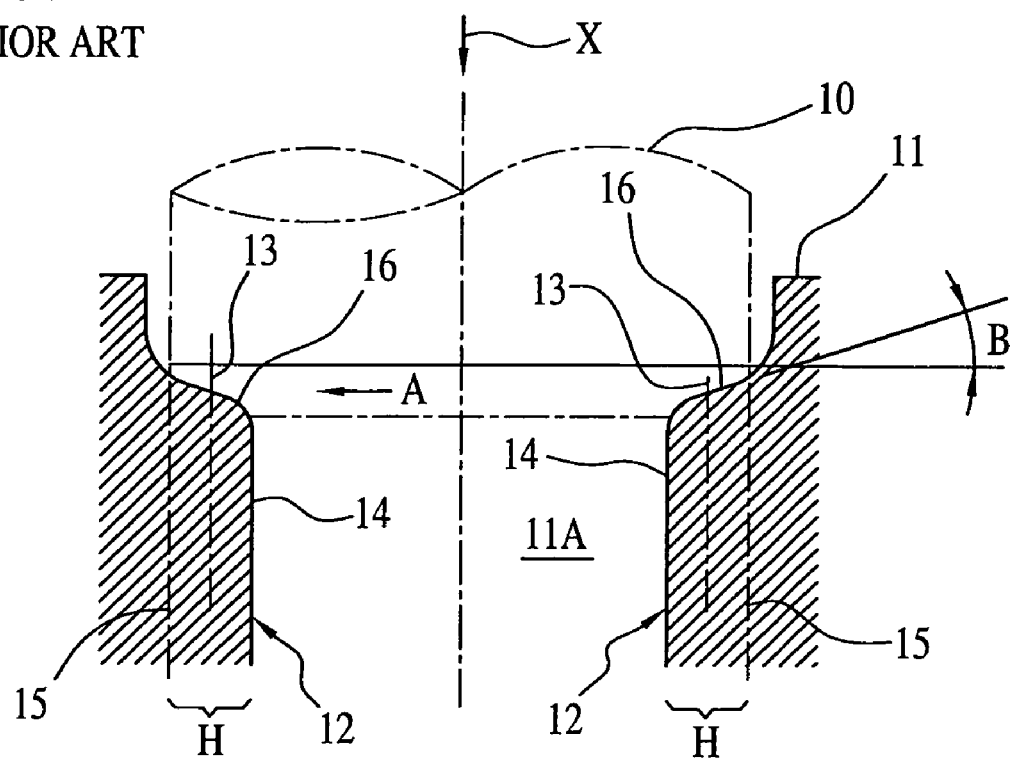
FIG. 1(A) is a sectional view along 1-1 line of FIG. 1(B) showing the method of manufacturing the spur gear in the prior art.
Figure 1B:
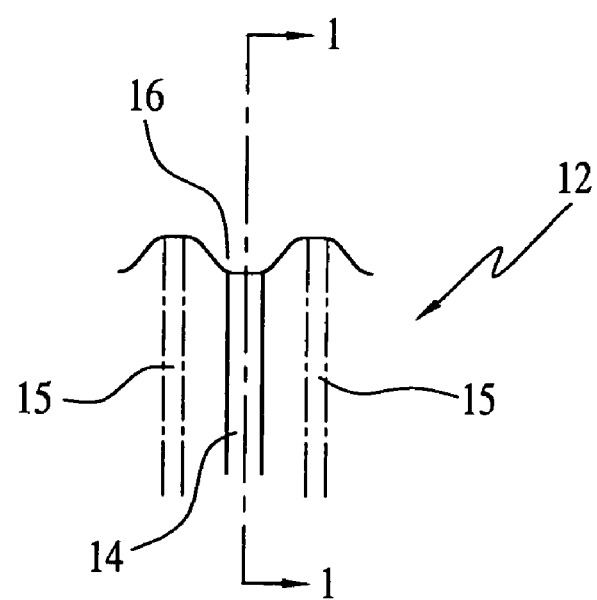
FIG. 1(B) illustrates a form receiving of the tooth profile of the die seen in the direction of arrow A of FIG. 1(A)
Figure 2A:
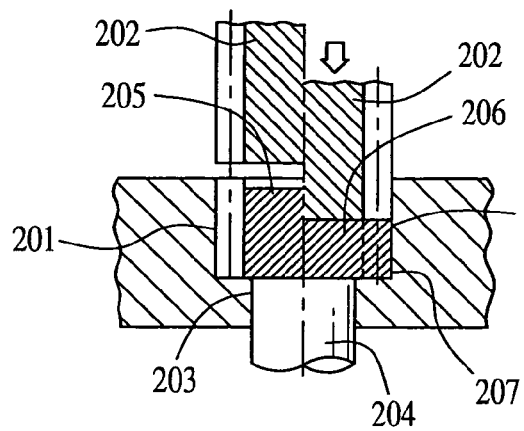
FIG. 2(A) is a sectional view of the die used in the first processing step of another method in the prior art.
Figure 2B:
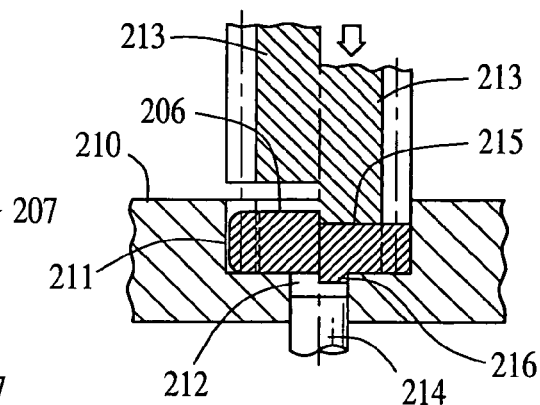
FIG. 2(B) is a sectional view of the die used in the second processing step.
Figure 2C:
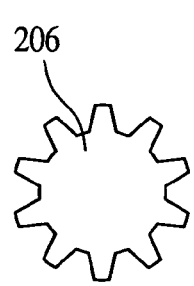
FIG. 2(C) to (E) drawings comparing tooth profiles formed in the first processing step and the second processing step.
Figure 2D:
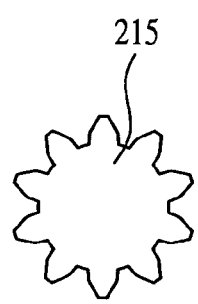
Figure 2E:
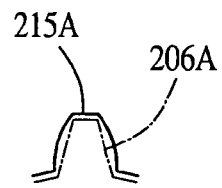

In contrast to the conventional example shown in FIG. 1, the metal preform 20 of FIG. 3 has a diameter smaller than the diameter of the addendum circle 24. If the diameter of the metal preform 20 is about 35 mm, for example, the addendum circle 24 is set 0.02 to 0.2 mm larger than the preform 20 in diameter.

A pressure pin 28 is provided above the metal preform 20 as a pushing member. The pressure pin 28 has an end 28a. The end 28a abuts on the metal preform 20. The end 28a is substantially identical to the metal preform in diameter.

Under the metal preform 20, a support pin 29 is provided as a support member. The support pin 29 supports the metal preform 20. The support pin 29 is stationary due to a support means not shown in the figure. A male tooth profile 29a is formed around the support pin 29. The male tooth profile 29a of the support pin 29 corresponds to the female tooth profile 27 of the die 21.

One example of a method of manufacturing the helical gear with the die 21 etc. by cold forging will be described.

First, the metal preform 20 is inserted into the die 21. Directly under the metal preform 20, the support pin 29 is arranged in advance.

The metal preform 20 inserted into the die 21 with pushing by means of the pressure pin 28.

In an initial step of first pushing, the metal preform 20 is compressed, vertically shortened between the upper and lower end faces, extruded outwardly to protrude into the surface of the die 21, to form a tooth profile smaller than the tooth profile 27 at the middle of the normal tooth profile 27 of the die 21.

Thus a tooth profile is formed in the first pushing step. Furthermore, in the intermediate step, the forming pressure and the forming speed are changed. In the second or third pushing, the normal tooth profile corresponding to the normal tooth profile 27 is formed into the processed product.

In the intermediate step, the tooth thickness remains unchanged. At the same time, the addendum part gradually radially expands in plural cold forging steps of forming an arc approaching the addendum of the completed tooth profile.

In addition, in the case of the product having the large face width or high precision, it is passed through a sizing die having the tooth profile in a finishing step. Thus, high precision is obtained for the tooth profile etc. In this case, it is appropriate to set the amount of sizing around 0.01 to 0.2 mm, for example.

In the initial step, the intermediate step, and the completing step, if the tooth profile of the die is changed, it is also possible to form the spur gear in the similar way.

Figure 4:
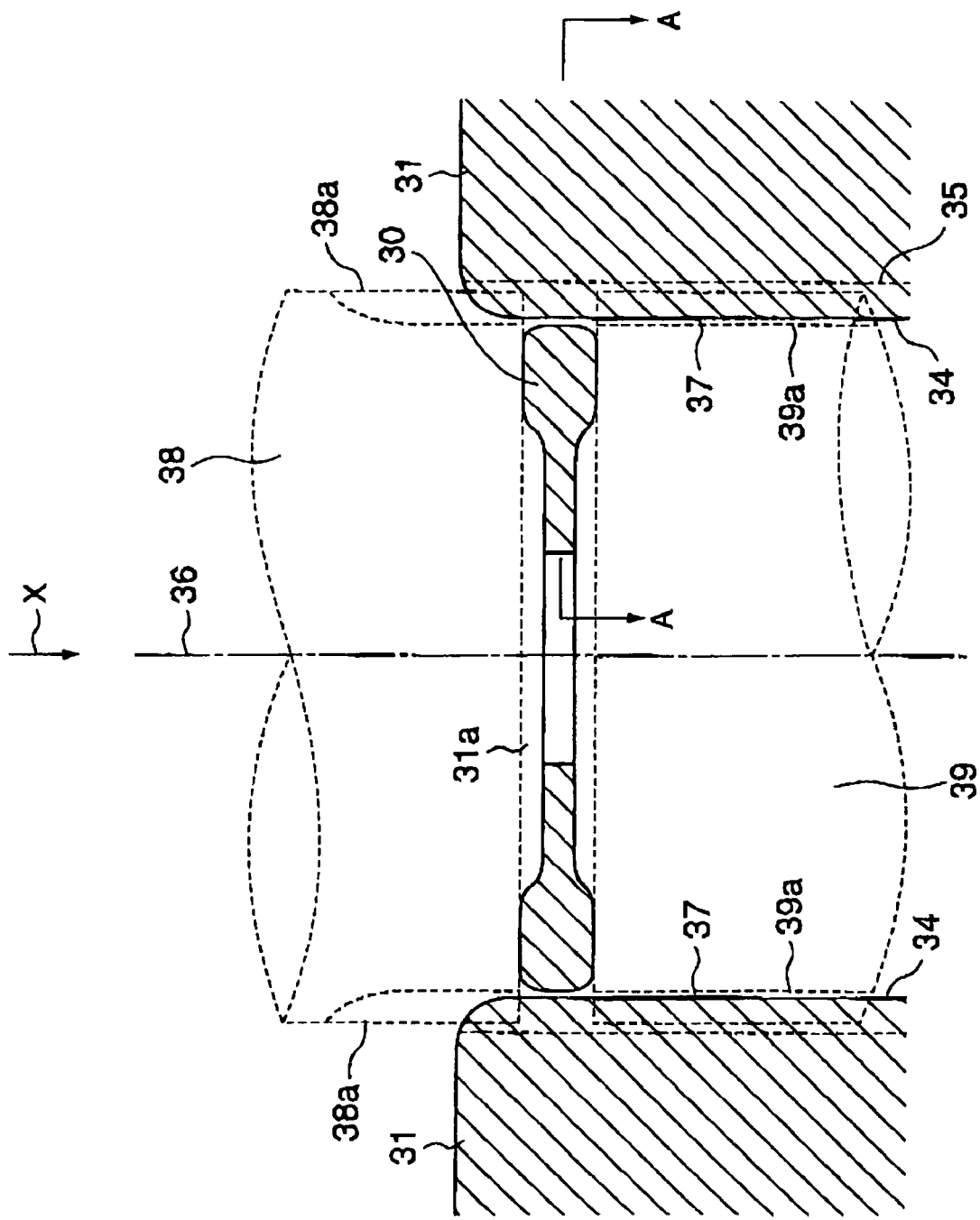
FIG. 4 illustrates another embodiment of the present invention.
Figure 5:
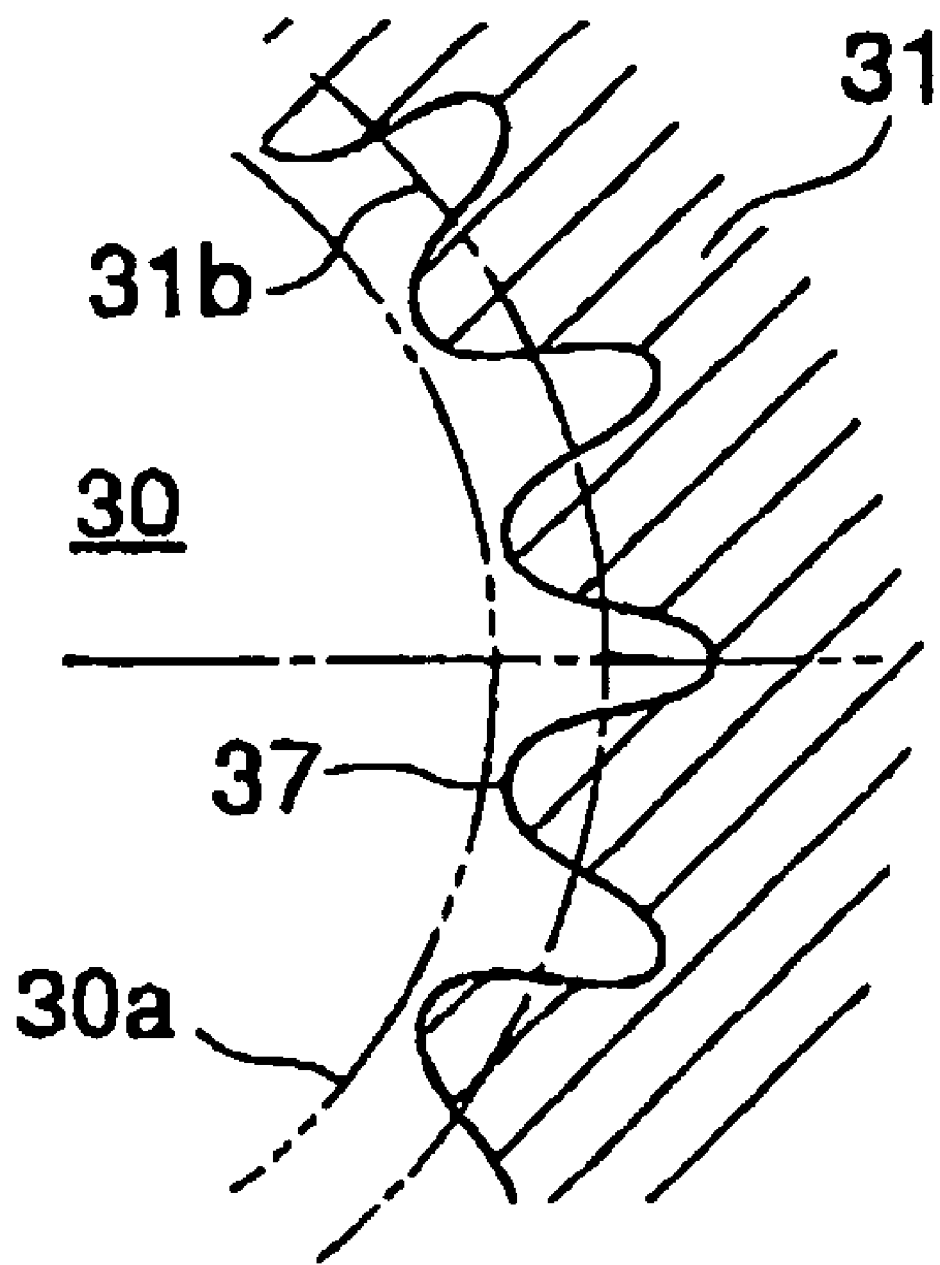
FIG. 5 is a sectional view along A-A line of FIG. 4.

Embodiment of FIGS. 4 to 5

FIGS. 4 to 5 show another embodiment of the present invention. In the embodiment, a spur gear is formed on the outer circumferential surface of the metal preform 30 under a relatively low load. FIG. 4 shows the preform before forming the tooth profile. FIG. 5 is a sectional view along A-A line of FIG. 4.

A die 31 has a bore 31a. The bore 31a penetrates a shaft center 36. A female tooth profile 37 is formed on a circumferential surface of the bore 31a. The tooth profile 37 is configured as a normal spur gear. Reference numeral 34 designates a dedendum circle of the tooth profile 37. Reference numeral 35 designates an addendum circle of the tooth profile 37. Reference numeral 30a designates an outer diameter of the metal material 30. Reference numeral 31b designates a pitch circle of the die 31.

The metal material 30 is configured as a thin plate with a cylindrical outer circumferential surface and thickened by the same width on both sides of the outer tooth forming part. Although it is preferable to thicken both the sides of the metal material 30 equally, it may be thicken only one of both.

Above the metal material 30, a punch 38 having a tooth is provided. The punch 38 pushes the metal material 30 in the direction of arrow X. The punch 38 has a male tooth profile 38a at a lower part thereof. The male tooth profile 38a corresponds to a female tooth profile 37 of the die 31.

Under the metal material 30, a support pin 39 is provided as a support member. The support pin 29 supports the metal material 30. The support pin 39 is stationary due to a support means not shown in the figure. A male tooth profile 39a is formed around the support pin 39. The male tooth profile 39a of the support pin 39 corresponds to the female tooth profile 37 of the die 31.

One example of a method of manufacturing the helical gear by means of the die 31 etc. by cold forging will be described.

First, the metal preform 30 is inserted into the die 31. Directly under the metal preform 30, the support pin 39 is arranged in advance.

In a first forging, the inserted metal preform 30 is pushed by means of the punch 38. Thereby, the thickened part of the metal material 30 is extruded outwardly. In a second and the following pushing, the metal material 30 protrudes into the die 30 to form a gear with the same precision as the die 31. Thus, it is possible to obtain a gear corresponding to the die 31.

Finally, in the completing step, the tooth profile of the processed product is sized and finished.

Figure 6:
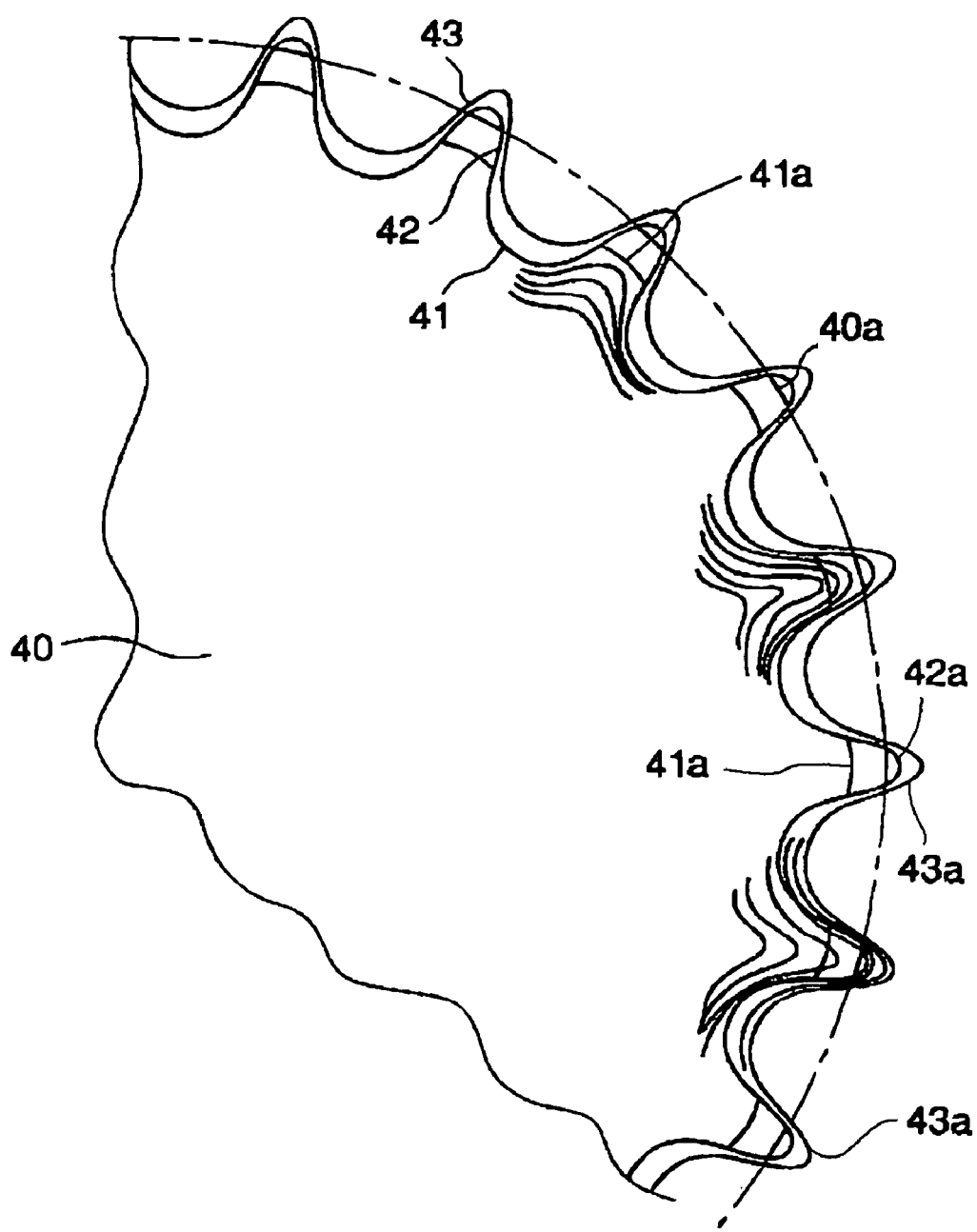
FIG. 6 illustrates another embodiment of the present invention.
Figure 7:
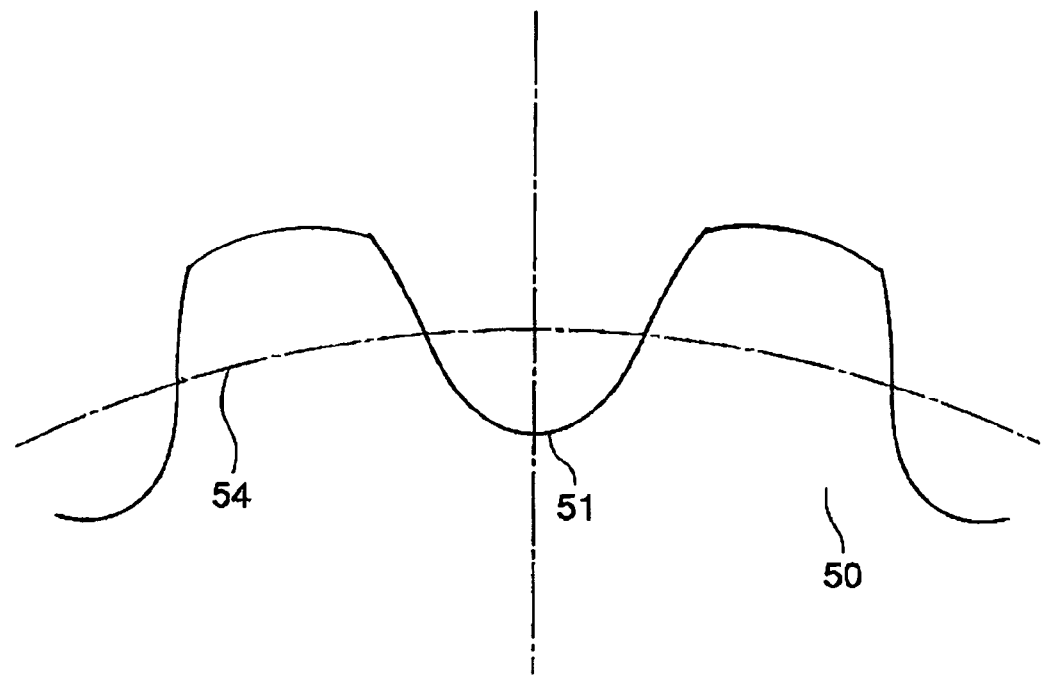
FIG. 7 illustrates a tooth profile 51 obtained in another embodiment of the present invention.

Embodiment of FIG. 6

FIG. 6 illustrates another embodiment of the present invention, wherein the processing is divided into a first stretching and a second ejecting of the metal material. Reference numeral 40 in the figure designates a crank sprocket as a gear of the present invention. Reference numeral 40a designates a pitch circle.

Each step will be described in the following.

In the first step, a metal preform is inserted into a die (not shown) and compressed by means of a punch. Thus, an initial tooth profile 41 having an addendum part smaller than that of the final tooth profile is obtained in the first step. An addendum part 41a of the tooth profile of the first step is configured as a large arc.

In the second step, the initial tooth profile 41 obtained in the first step is further cold-forged by means of a die having a tooth profile several percent smaller in tooth thickness than the die used in the first step and ejected. Thus, a tooth profile 42 of the second step is obtained. An addendum part of the tooth profile of the second step is designated by reference numeral 42a. The addendum part 42a is configured as a non-circular, rounded, and curved shape.

In the third step, the tooth profile 42 obtained in the second step is further expanded by means of a die having a tooth profile several percent smaller in tooth thickness than the die used in the second step. Thus, a tooth profile 43 of the third step is obtained. An addendum part of the tooth profile of the third step is designated by reference numeral 43a. The addendum part 43a is configured as a non-circular, rounded, and curved shape.

Thus, by means of use of three types of the dies, the final tooth profile is gradually formed with varying degrees of radial expansion to reduce the tooth thickness.

The tooth profile 43 obtained has a margin for sizing into the final tooth profile with no cracks.

Sizing by drawing for finishing is performed on the tooth profile 43.

Embodiment of FIGS. 7 to 10

Figure 8:
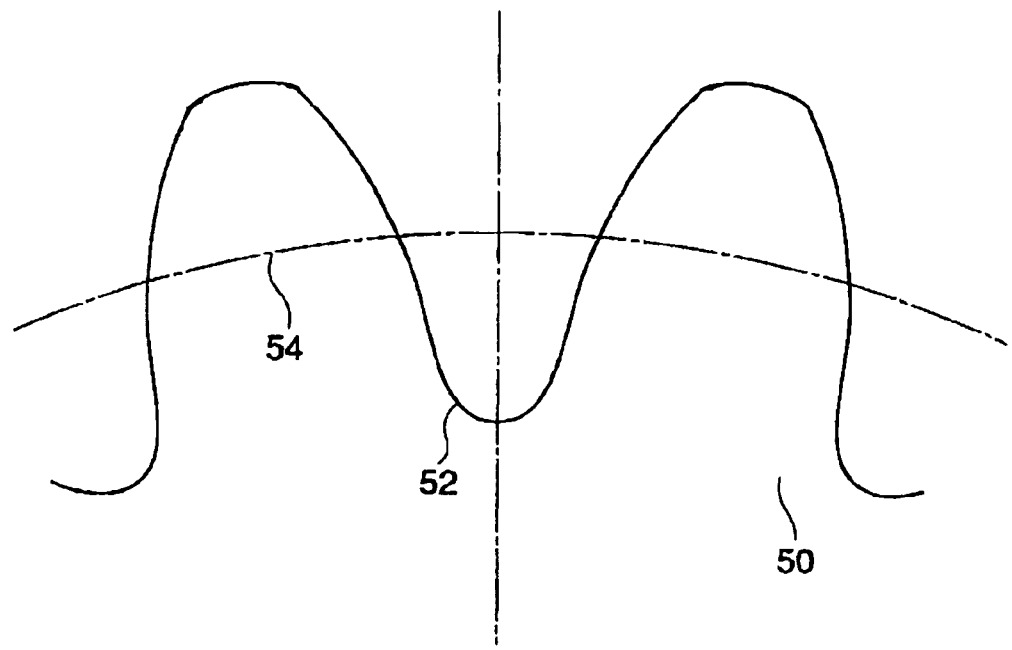
FIG. 8 illustrates a tooth profile 52 obtained in the step following FIG. 7.
Figure 9:
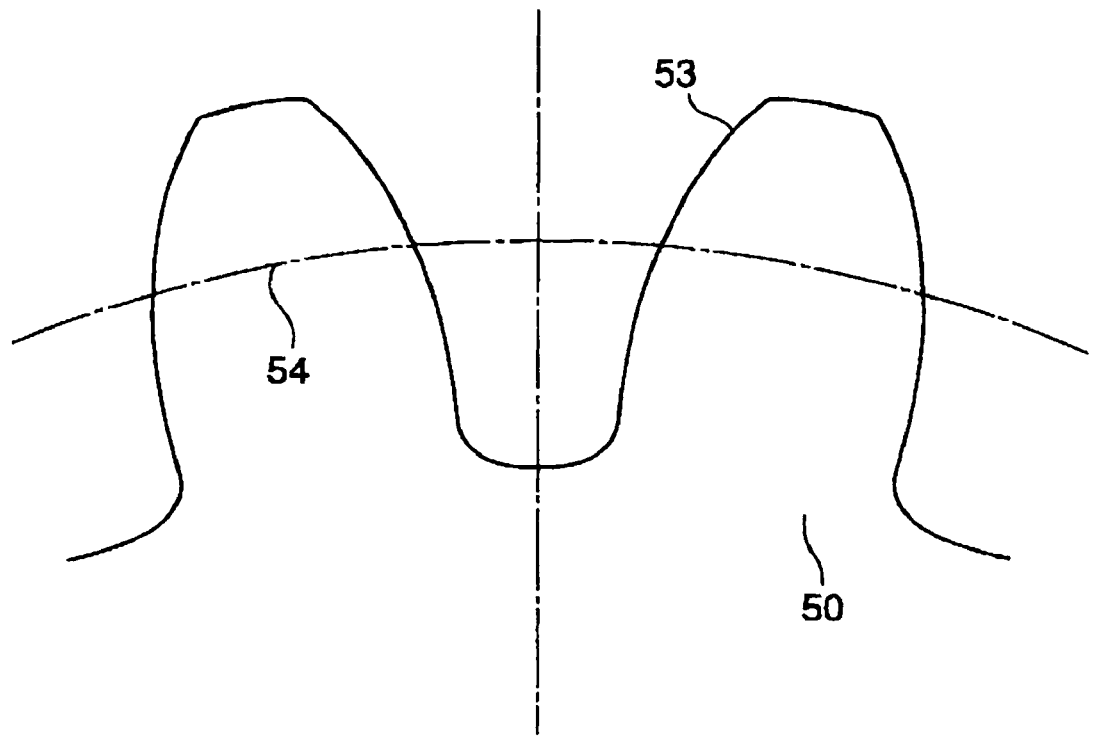
FIG. 9 illustrates a tooth profile 53 obtained in the step of FIG. 8.
Figure 10:
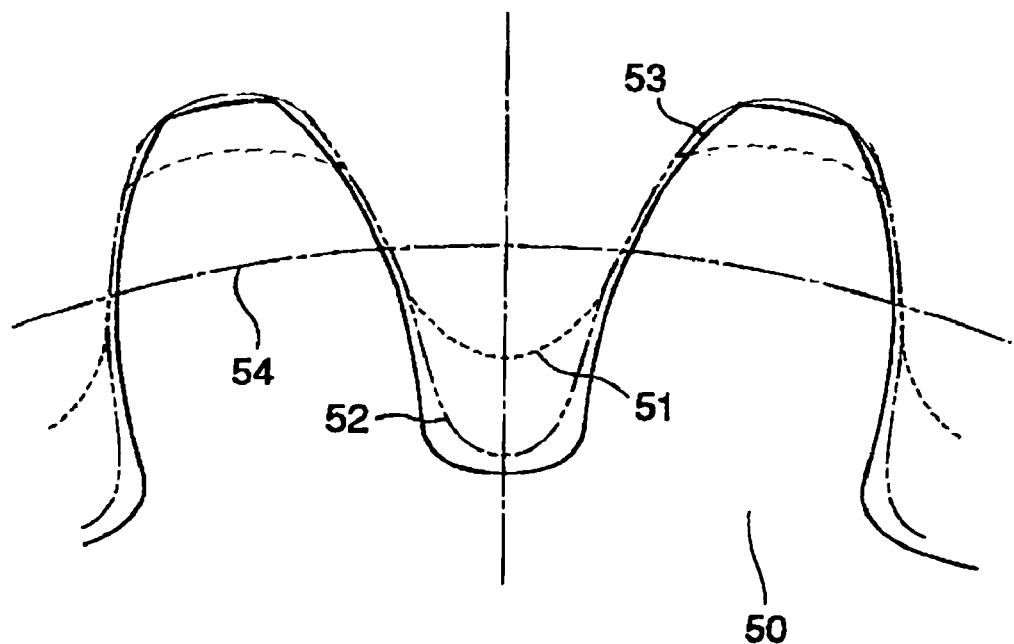
FIG. 10 is a combination of FIGS. 7 to 9.

FIGS. 7 to 10 illustrate another embodiment of the present invention. FIG. 10 is a combination of FIGS. 7 to 9. Reference numeral 50 designates a gear. Reference numeral 54 designates a pitch circle.

Each step will be described in the following.

In the initial step, the metal preform is inserted into a first die (not shown) and pressed. Thus, an initial tooth profile 51 of the initial step is obtained.

In the intermediate step, the initial tooth profile 51 having a round bottom shape obtained in the initial step is inserted into a second die (not shown) and ejected. Thus, a tooth profile 52 having a round dedendum shape of the intermediate step shown in FIG. 8 is obtained.

In the intermediate step, the tooth thickness is maintained identically. At the same time the dedendum part gradually protrudes as varying the round shape in plural cold forging steps and approaches the face of tooth of the completed tooth profile.

In the completing step, the tooth profile 52 obtained in the intermediate step is sized (namely drawn) and finished. Thus, the completed tooth profile 53 shown in FIG. 9 is obtained.

The completed tooth profile 53 obtained has a normal tooth profile and no cracks.

Embodiment of FIGS. 11 to 14

FIGS. 11 to 14 illustrates another embodiment of the present invention wherein pressing and ejecting of the metal preform are separated into two steps and combined with a sizing (drawing for finishing) step. Reference numeral 60 designates a gear. Reference numeral 64 designates a pitch circle.

Each step will be described in the following.

In the initial step, a metal preform is inserted into a die (not shown) and stretched. Thus, an initial tooth profile 61 having an addendum part with an arc shape as shown in FIG. 11 is obtained.

In the intermediate step, the initial tooth profile obtained in the initial step is inserted into a die (not shown) different from the die used in the initial step and ejected. Thus, a tooth profile 62 having an addendum part with an arc shape as shown in FIG. 12 is obtained.

In the completing step, the tooth profile 62 obtained in the intermediate step is sized. Thus, a tooth profile 63 shown in FIG. 13 is obtained.

Figure 11:
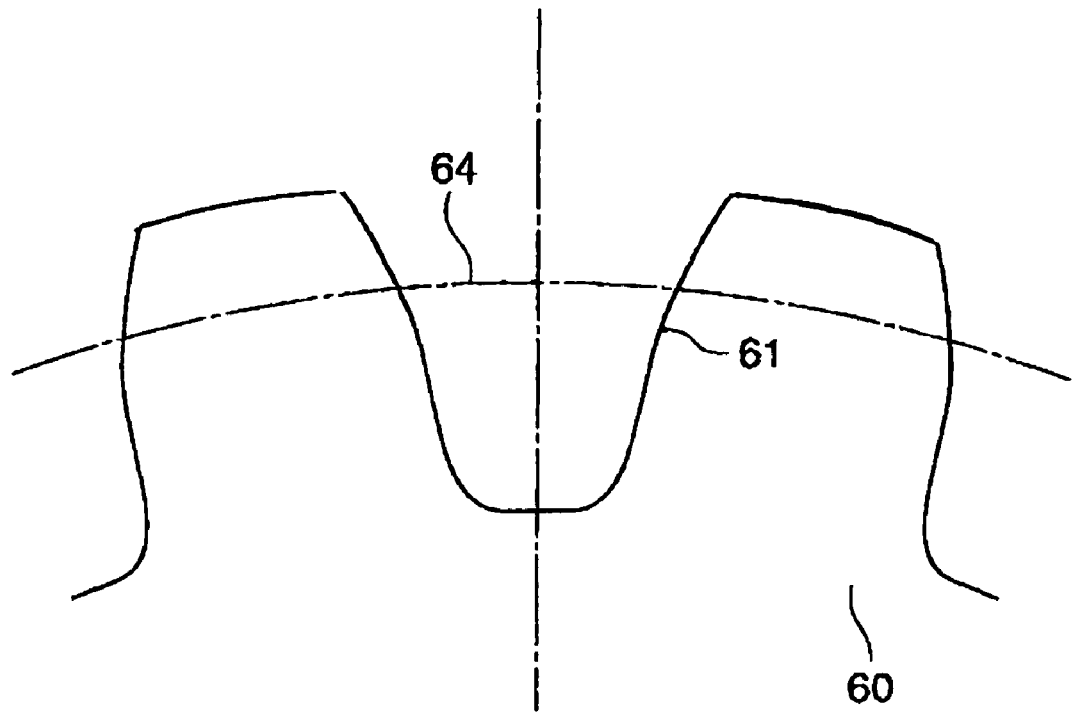
FIG. 11 illustrates a tooth profile 61 obtained in another embodiment of the present invention.
Figure 12:
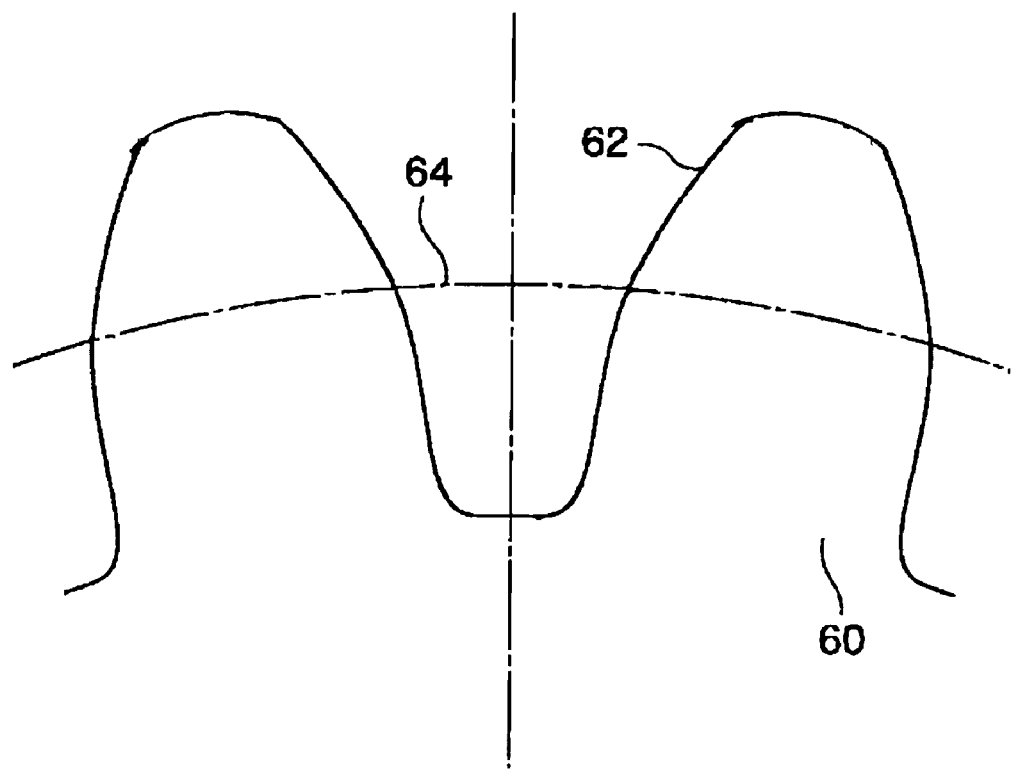
FIG. 12 illustrates a tooth profile 62 obtained in the step following FIG. 11.
Figure 13:
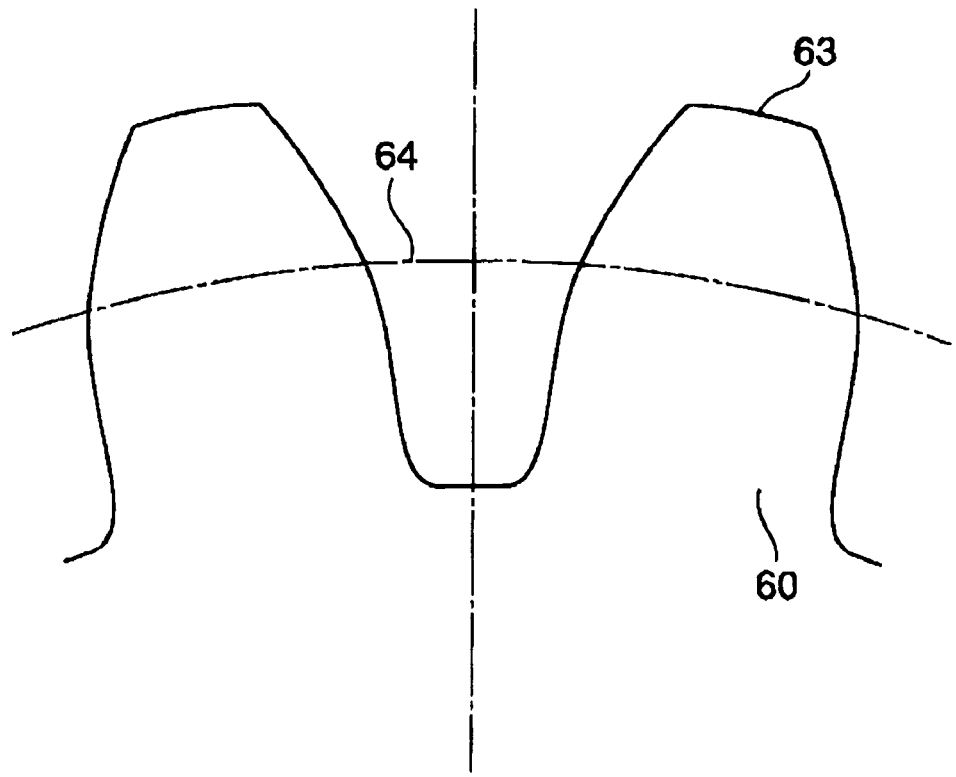
FIG. 13 illustrates a tooth profile 63 obtained in the step following FIG. 12.
Figure 14:
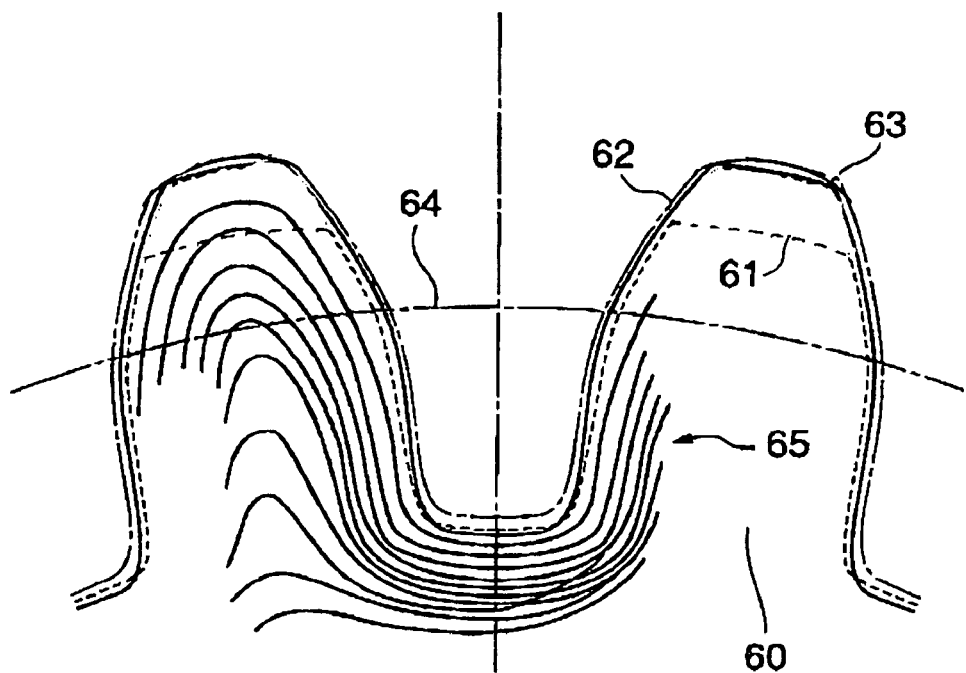
FIG. 14 is a combination of FIGS. 11 to 14.

FIG. 14 is a combination of FIGS. 11 to 13.

Reference numeral 65 schematically illustrates a fiber flow after the second step. The tooth profile 63 obtained has good fiber flow and no cracks.

Figure 15:
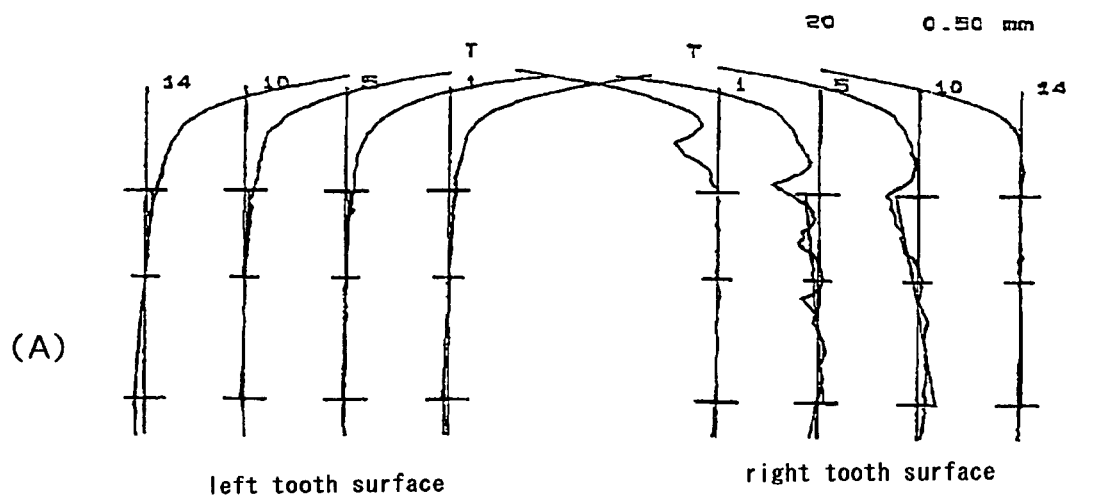
FIG. 15 illustrates another embodiment of the present invention.
Figure 15:
Figure 15:
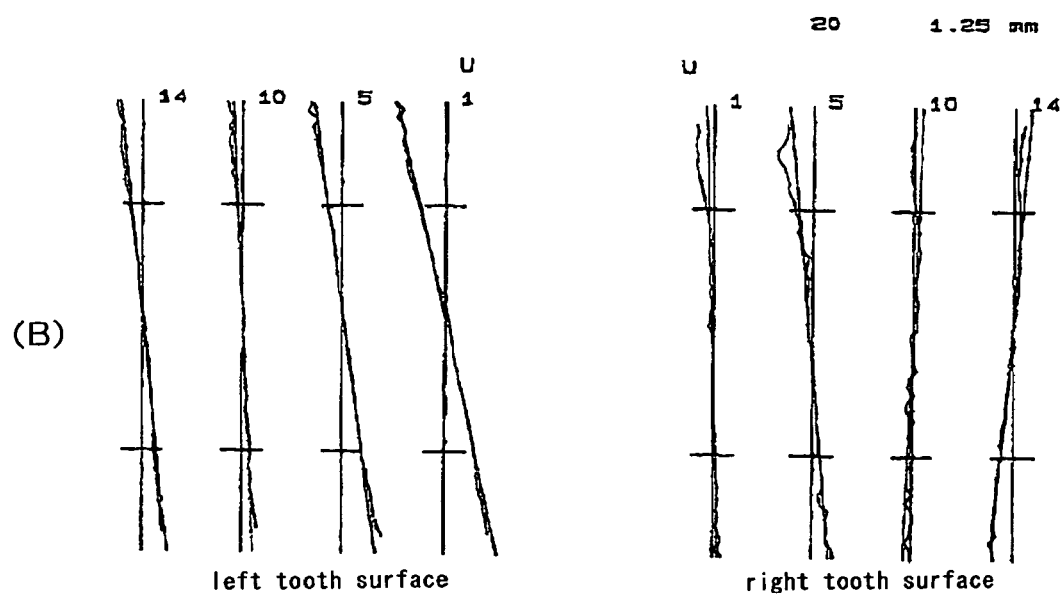
Figure 15:

Embodiment of FIG. 15

FIG. 15 illustrates another embodiment of the present invention.

The embodiment illustrates data with respect to a tooth profile (A) and a tooth trace (B) of a helical gear formed by radial expansion of the metal preform. The data was obtained by means of a three-dimensional measuring apparatus.

In FIG. 15, numbers of 1, 5, 10, and 14 above (A) and (B) are numbers of teeth in order. Numbers under (A) and (B) are values measured with zero as a reference value and precision classes of Japanese Industrial Standard. The shape of the left tooth surface is shown on the left side. The shape of the right tooth surface is shown on the right side.

TABLE 1 shows tooth number, module, pressure angle, helix angle, addendum modification coefficient, and base circle.

TABLE 1

| tooth number | module | pressure angle | helix angle | addendum modification coefficient | base circle |
| --- | --- | --- | --- | --- | --- |
| 18 | 1.0000 | 20.000° | −25.000° | 0.4918 | 18.4301 |
| 2.7740 | 8.0000 | 2.1700 | 2.1700 | 5.4929 | 22.2600 |
| 0.8000 | 8.0000 | 2.2000 | 2.2000 | 4.0019 | 19.1000 |

It can be seen that a gear in highest quality can be obtained, even if the gear is formed by stretching (bulging) and ejecting (protruding).

Figure 16:
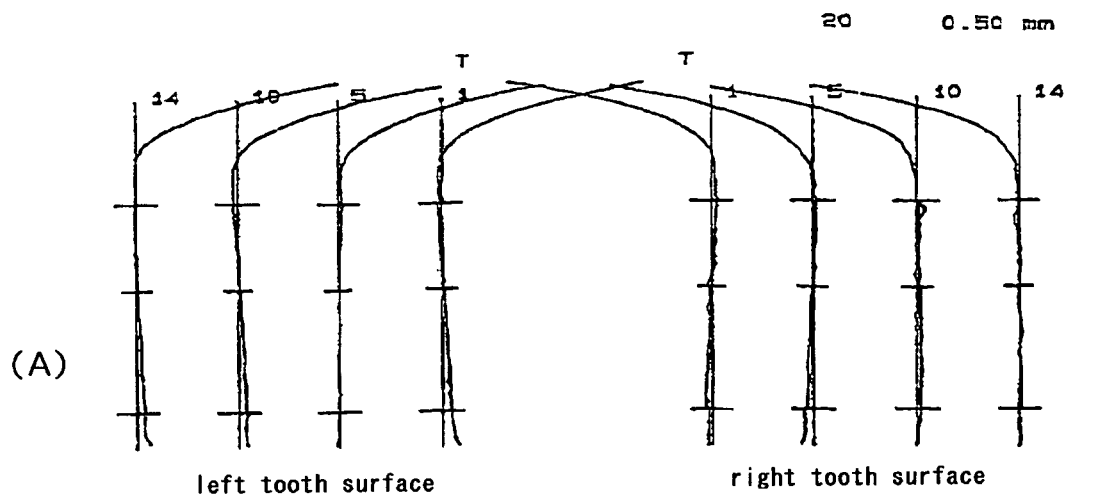
FIG. 16 illustrates another embodiment of the present invention.
Figure 16:
Figure 16:
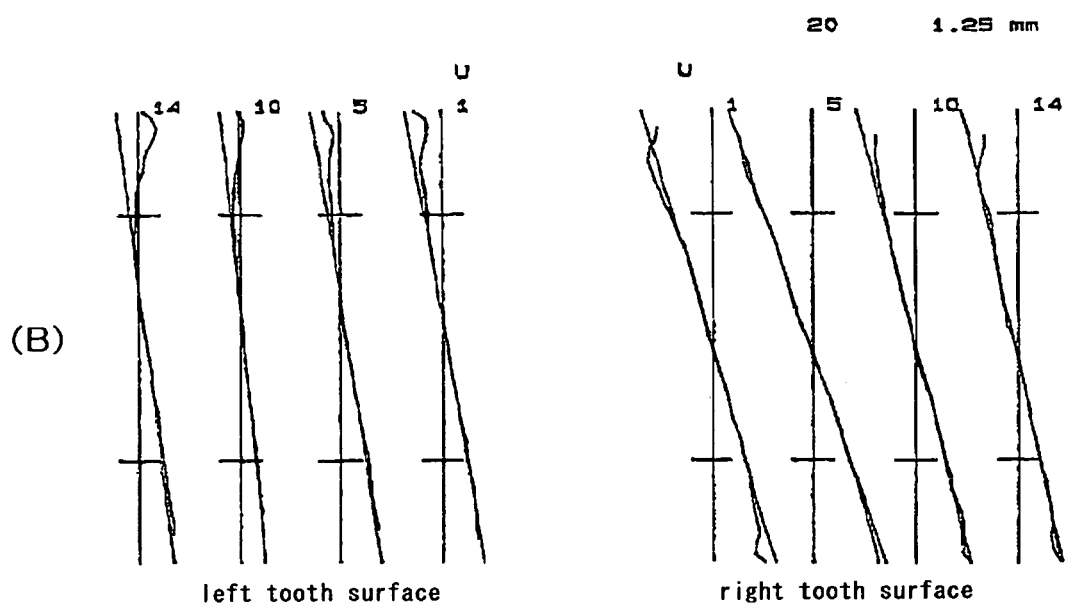
Figure 16:

Embodiment of FIG. 16

FIG. 16 illustrates another embodiment of the present invention.

The embodiment illustrates data with respect to a tooth profile (A) and a tooth trace (B) of a helical gear formed by radial expansion, and further drawing of the metal material. The data was obtained by means of a three-dimensional measuring apparatus.

In FIG. 16, numbers of 1, 5, 10, and 14 above (A) and (B) are numbers of teeth in order. Numbers under (A) and (B) are values measured with a zero as a reference value and precision classes of Japanese Industrial Standard. The shape of the left tooth surface is shown on the left side. The shape of the right tooth surface is shown on the right side.

Tooth number, module, pressure angle, helix angle, addendum modification coefficient, and base circle used in the embodiment of FIG. 16 are the same as in TABLE 1.

Although the tooth profiles show classes 0 to 1 of Japanese Industrial Standard, there is a difference of 2 to 5 classes between the left tooth surface and right tooth surface of the tooth trace. Actual values can be estimated to be classes 2 to 4.

Figure 17:
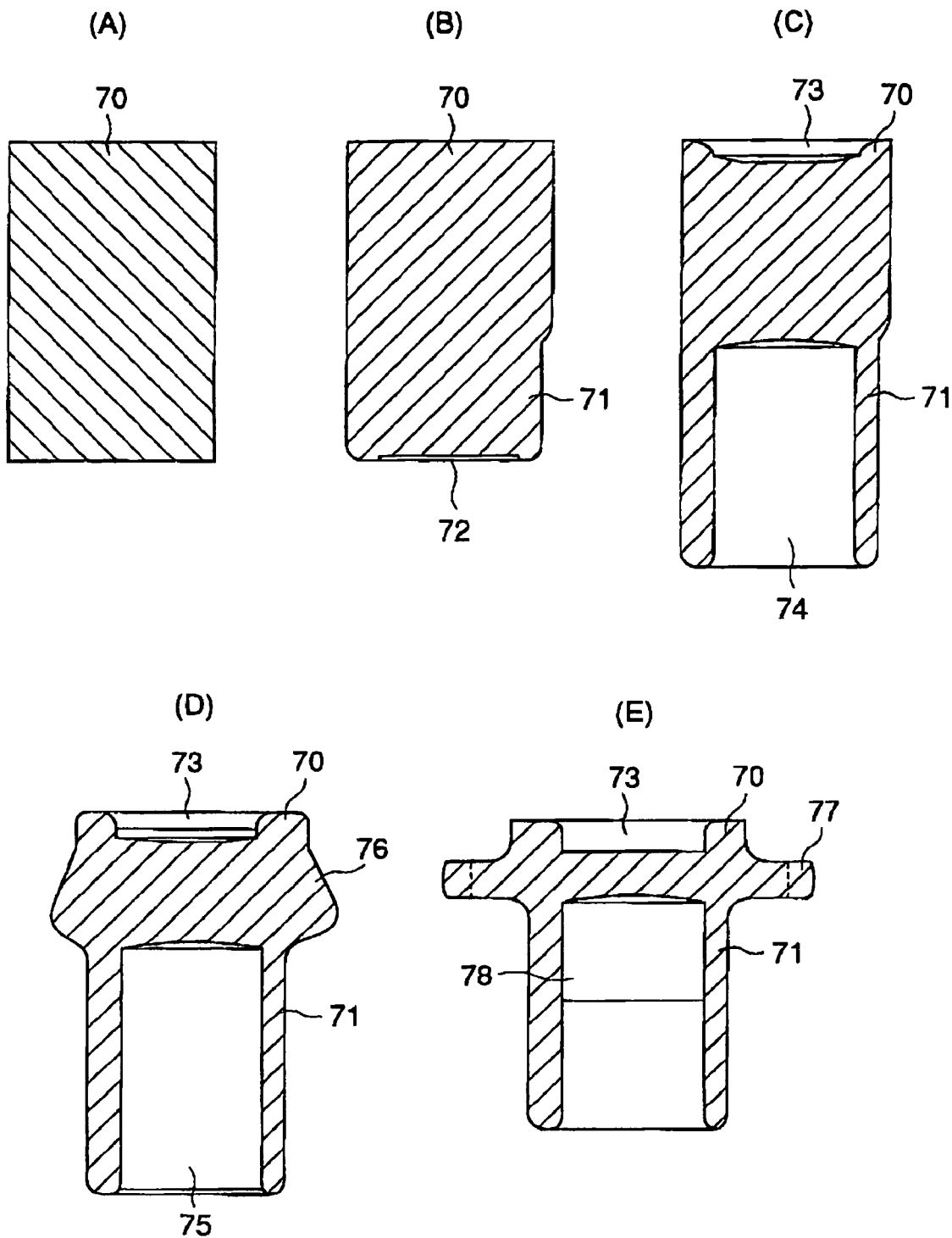
FIG. 17 illustrates another embodiment of the present invention.

Embodiment of FIG. 17

FIG. 17 illustrates another embodiment of the present invention. In the embodiment, radial expansion of the metal material is performed in a combination of various kinds of cold forging. A crank sprocket is manufactured as a gear by the following series of manufacturing steps.

(A) illustrates a cylindrical preform 70 produced by cutting a solid metal cylinder in a predetermined length from a coil material.

(B) illustrates a processed product in which the preform 70 is cold-forged under the condition (A) to form a reduced diameter intermediate 71 with a depression 72 in its lower end face.

(C) illustrates the preform 70 after cold-forging under the condition (B) to form an upper depression 73 and a lower deep bore 74.

(D) illustrates the preform 70 after cold-forging under the condition (C) to form an expanded diameter portion 76 and a lower deep bore 75.

(E) illustrates the preform 70 after radial expansion under the condition (D) in a die not shown in the figure to form an initial tooth profile 77 larger than the normal tooth profile in tooth thickness and small addendum. A new bore 78 is formed at a lower part thereof.

Figure 18:
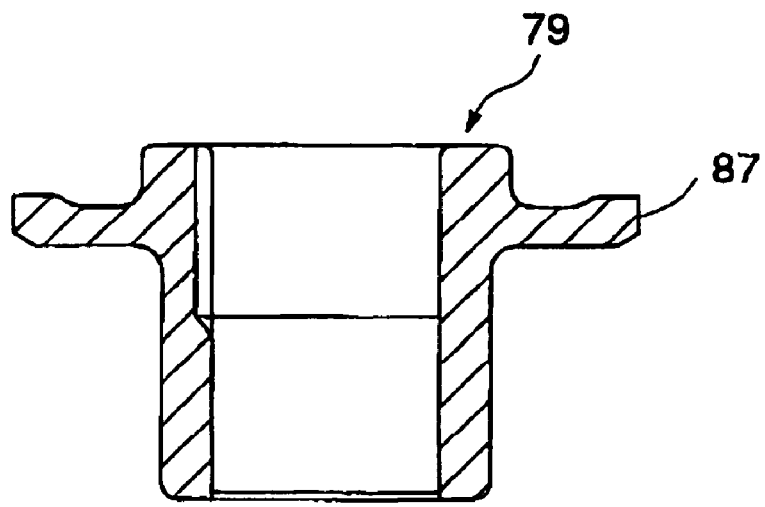
FIG. 18 illustrates one example of a finished crank sprocket manufactured according to the present invention.

After the above-described steps, the bore is completed to obtain a completed product shown in FIG. 18.

Figure 19:
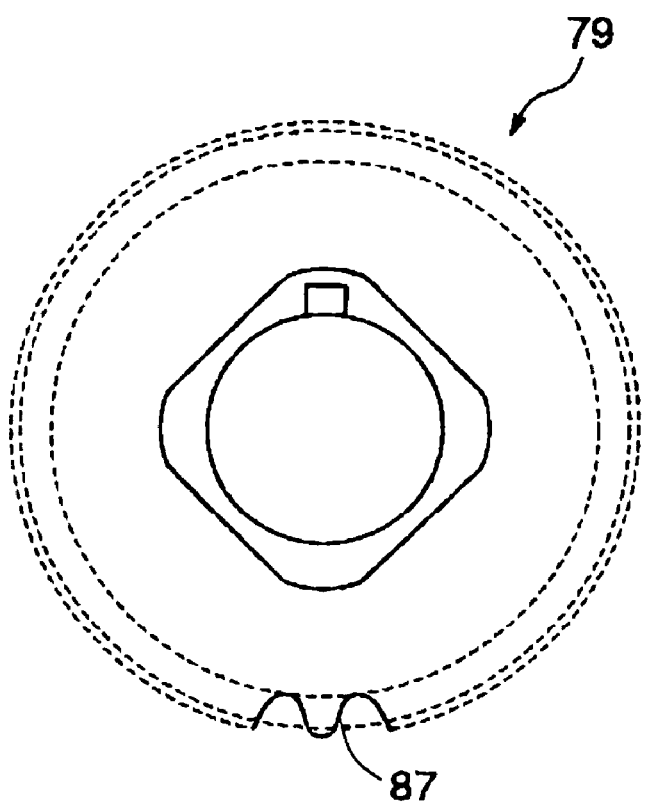
FIG. 19 is a schematic front view of the sprocket shown in FIG. 18.

FIGS. 18 to 19 illustrate a crank sprocket 79 formed from the processed product. The crank sprocket 79 has a normal tooth profile 87. FIG. 19 is a schematic front view of the crank sprocket of FIG. 18.

The crank sprocket 79 shown in FIG. 18 and FIG. 19 is formed from the product of FIG. 17(E).

Tooth thickness is maintained substantially identical to the tooth thickness of the initial tooth profile 77. Or, the tooth profile is reduced in the range of a few % smaller than that of the initial tooth profile 77. At the same time, the addendum part is expanded as compared to the initial tooth profile 77. As a result, a completed product having a completed tooth profile 87 (FIGS. 18 to 20) is obtained.

Figure 20:
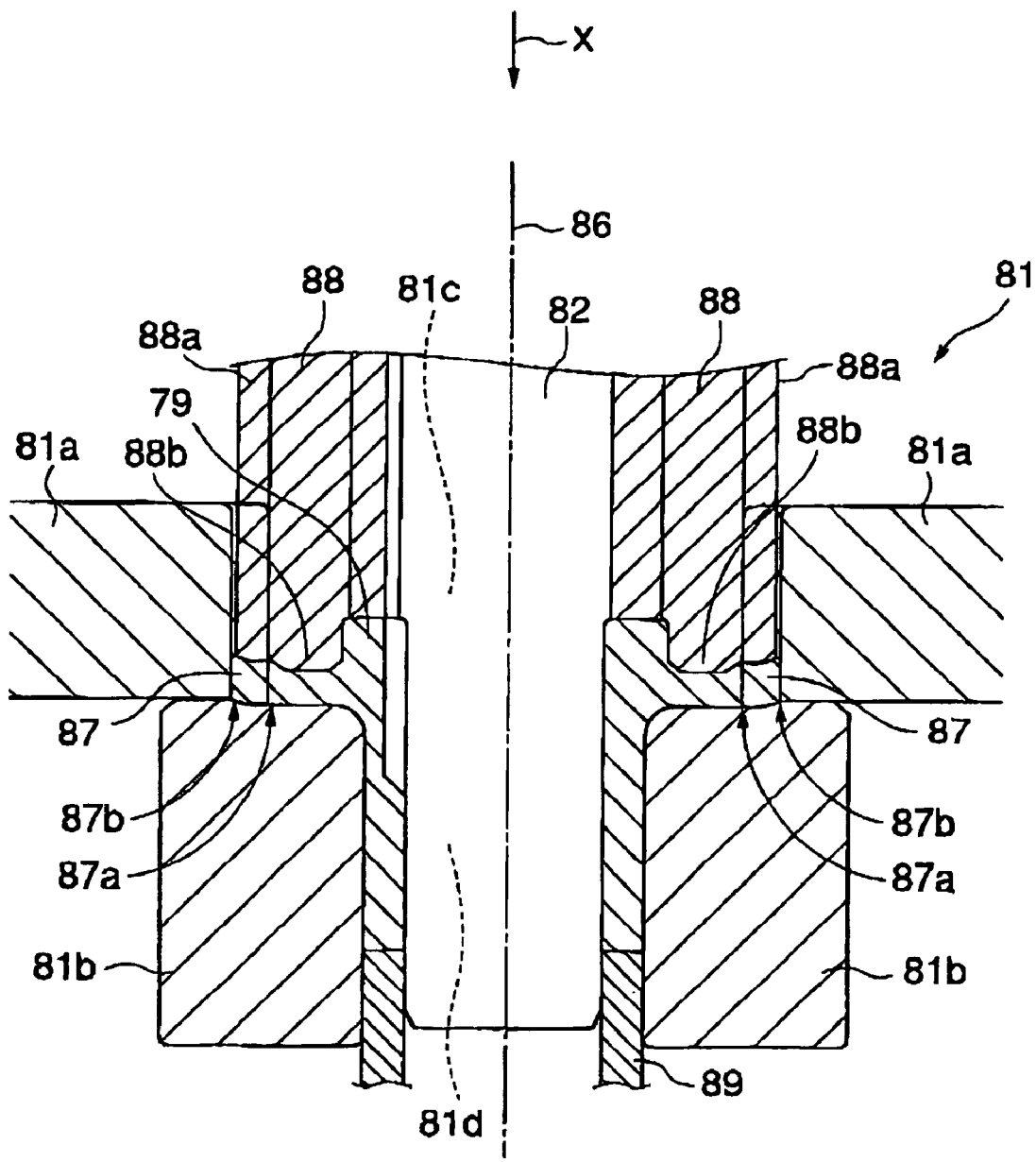
FIG. 20 illustrates another embodiment of the present invention.

Embodiment of FIG. 20

FIG. 20 illustrates one example of manufacturing the sprocket shown in FIGS. 18 to 19. FIG. 20 shows the completed tooth profile 87.

A die set 81 comprises a die 81a and a die 81b.

A bore 81c passes through in the direction of a central axis 86 of the die 81a. A female tooth profile 87 is formed on a circumferential surface of the bore 81c. The tooth profile 87 is configured as a normal tooth profile. Reference numeral 87a designates an addendum circle of the tooth profile 87. Reference numeral 87b designates a dedendum circle of the tooth profile 87b.

The die 81b is arranged under the die 81a. A bore 81d smaller than the bore 81c in diameter passes through in the direction of the central axis 86 of the die 81b. A circumferential surface of the bore 81d corresponds to a lower outer circumferential surface of the crank sprocket 79. An upper surface of the die 81b supports the tooth profile 87.

A punch 88, used as a pushing member, is provided above the crank sprocket 79. The punch 88 pushes the crank sprocket 79 in the direction indicated by an arrow X.

A male tooth profile 88a is formed on an outer circumferential surface of the punch 88. The male tooth profile 88a corresponds to the female tooth profile 87 of the die 81a. The punch 88 has a lower end 88b. The lower end 88b corresponds to the upper surface of the crank sprocket 79 in shape.

A knock out sleeve 89 is provided under the crank sprocket 79 for supporting the lower end of the crank sprocket 79. The knock out sleeve 89 is stationary due to a support means not shown in the figure.

A punch mandrel passes inside the crank sprocket 79.

A method of forming the crank sprocket by cold forging with the die 81 etc. of FIG. 20 will be described.

First, a metal preform to be given a tooth profile (not shown) is inserted into the die 81. Directly under the metal preform, the knock out sleeve 89 is arranged in advance. The punch mandrel 82 is inserted inside the metal preform.

The metal preform inserted into the die 81 is pushed by means of the punch 88.

The metal material pushed is radially expanded to form the tooth profile 87 corresponding to the tooth profile of the die 81a.

Thus, it is possible to obtain the crank sprocket 79 by means of the die set 81.

Figure 21:
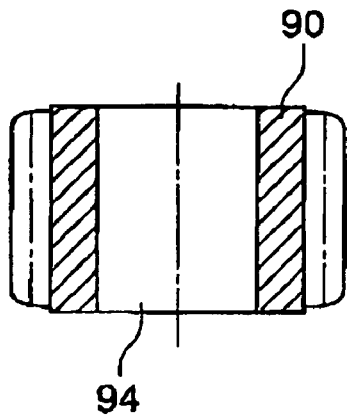
FIG. 21 illustrates another embodiment of the present invention.

Embodiment of FIG. 21

FIG. 21 illustrates another embodiment of the present invention. In the embodiment, a helical gear pinion is formed.

One example of a method of forming a helical gear pinion 90 will be described.

A cylindrical metal preform provided with a bore in advance is arranged in a die (not shown). The metal preform is pushed in the direction of its central axis such that a pin (not shown) corresponding in shape to the bore is inserted in the bore. The metal preform is expanded in the radial direction. After that, it is ejected with a tooth profile similar to the tooth profile of the corresponding die.

After ejecting, the helical gear pinion 90 is drawn from the die by rotation along the helix angle.

One example of the helical gear pinion 90 has a helix angle (helix direction) of 25° (left) and precision of class 4 or 5 of Japanese Industrial Standard.

Figure 22:
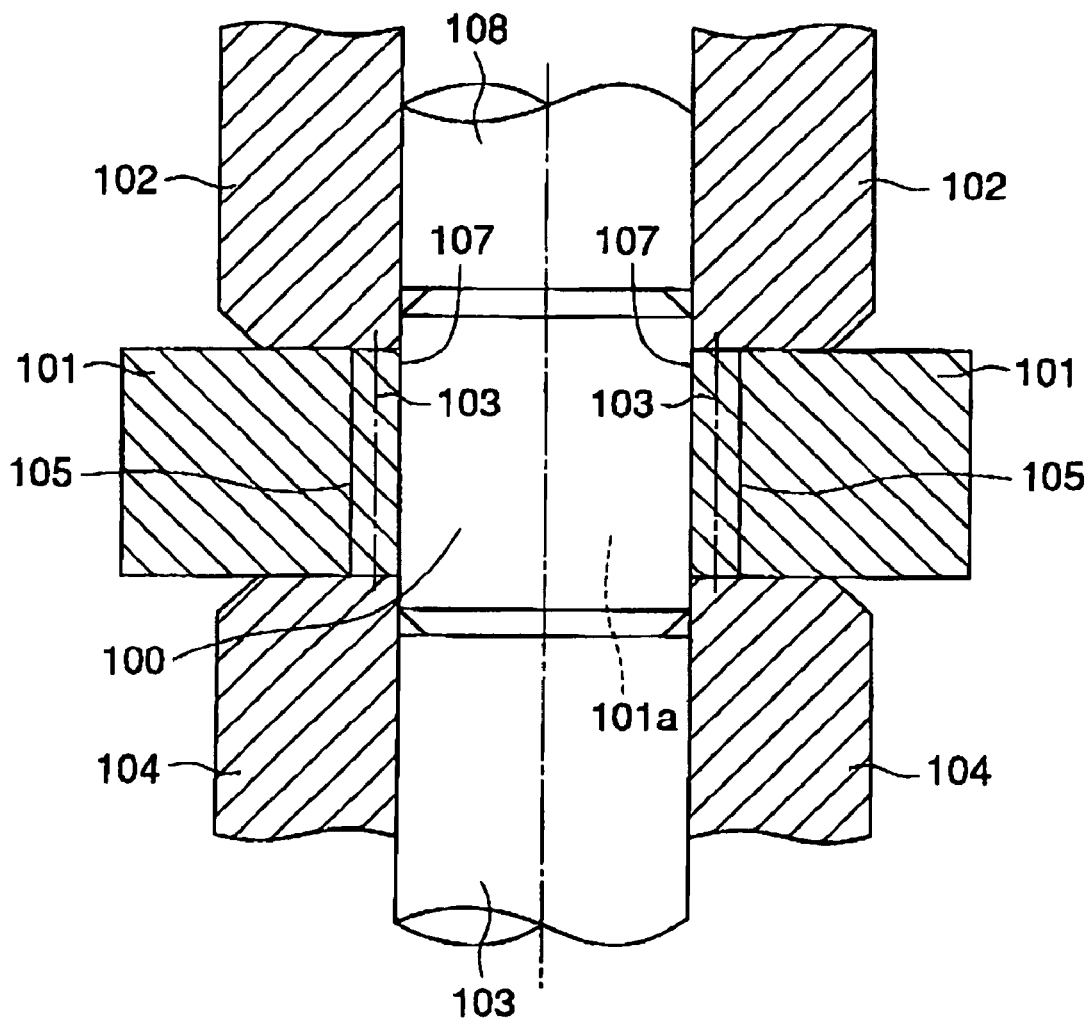
FIG. 22 illustrates another embodiment of the present invention and illustrates the form starting condition of the product to be processed.
Figure 23:
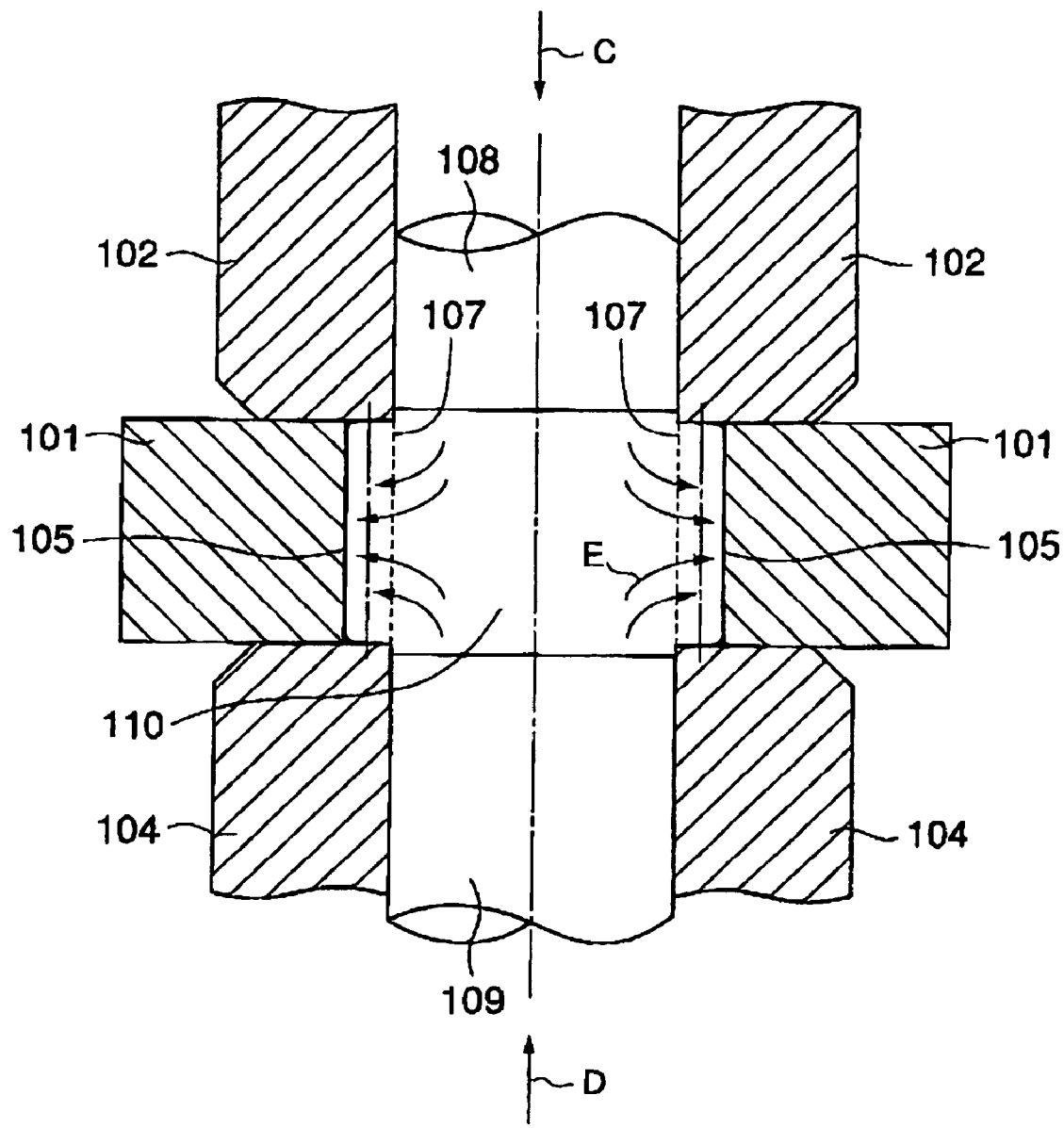
FIG. 23 illustrates the form-finished condition of the product.

Embodiment of FIG. 22 and FIG. 23

If relative displacement between the die and the product to be processed is reduced, a processed product close to the die in precision is obtained. One example of the method will be described in reference to FIGS. 22 to 23.

FIG. 22 illustrates a starting condition in forming the product. FIG. 23 illustrates a completion of forming the product.

Die 101 is the main die for forming a tooth profile. For easy understanding, the die 101 is illustrated in a stationary condition in FIG. 22. In actual practice, the die 101 may move.

The die 101 has a bore 101a. The bore 101a penetrates in the direction of the central axis 106. A female tooth profile 107 is formed on a circumferential surface of the bore 101a. The tooth profile 107 is configured as a normal tooth profile. Reference numeral 103 designates the pitch circle. Reference numeral 104 designates an addendum circle of the tooth profile 107. Reference numeral 105 designates a dedendum circle of the tooth profile 107.

An upper extruding pin 108 is provided above the metal preform 100 as a pushing member and pushes the metal preform 100 from the above.

An upper sleeve 102 is provided around the upper extruding pin 108 to support the metal preform 100 and the upper extruding pin 108 from a side thereof.

A lower extruding pin 109 is provided as a pushing member under the metal preform 100. The lower extruding pin 109 pushes against the bottom of the metal preform 100 from a bottom thereof.

A lower sleeve 104, provided around the lower extruding pin 109, is fixed and supports the metal preform 100 and the lower extruding pin 109.

A method of manufacturing a gear by cold forging by means of the die 101 etc. of FIG. 22 will now be described.

The metal preform 100 is inserted into a central part of the die 101. After that, the upper extruding pin 108 and the upper sleeve 102 move downwardly to enclose the metal preform 100.

The upper sleeve 102 and the lower sleeve 104 are stopped.

A pressure in the direction indicated by an arrow C is applied to the upper extruding pin 108 and a pressure in the direction indicated by an arrow D is applied to the lower extruding pin 104. The upper sleeve 102 is stopped when it contacts the die 101 as a result of an oil pressure or a spring pressure. Thus, the metal preform 100 is expanded into the tooth profile 107 of the die 101. Thus, the tooth profile 107 is formed on the metal preform 100. By means of the same die, a forging condition (forming pressure, speed, etc.) is changed for each forming step, or different dies are used in each forming step.

An arrow E in FIG. 23 designates flow of the metal material schematically.

To remove a formed product 110 from the die 101, the upper extruding pin 108 and the upper sleeve 102 are moved upwardly. After that, the lower extruding pin 109 is moved upwardly to eject the formed product 110 out of the die 101.

In this way of forming, since relative displacement between the formed gear and the die is extremely small, it is possible to form the gear with high precision.

Figure 24:
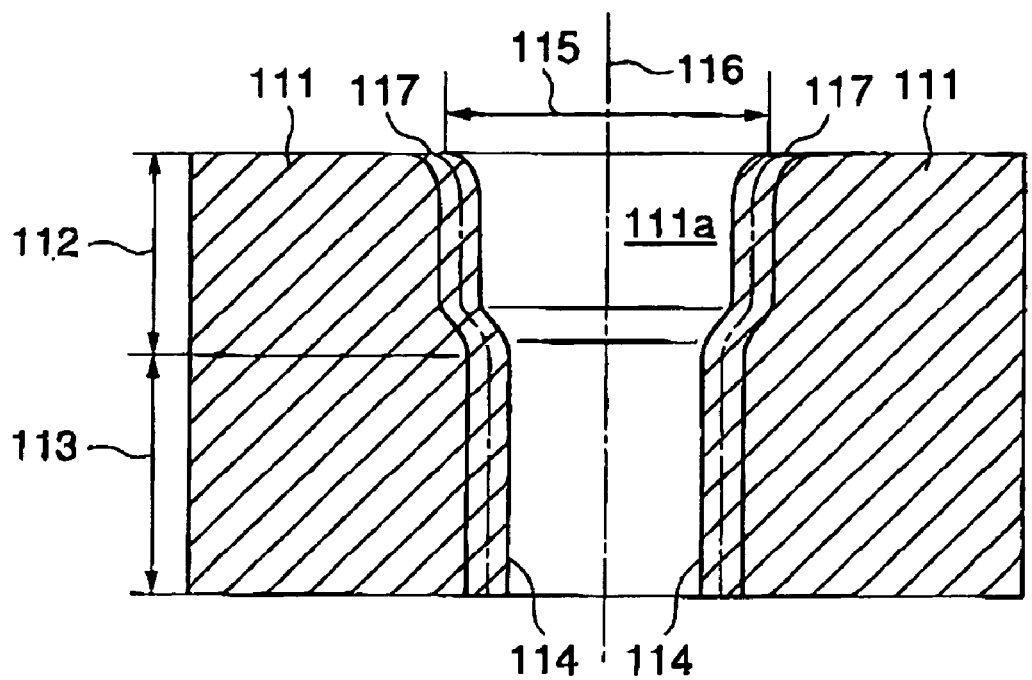
FIG. 24 illustrates another embodiment of the present invention.

Embodiment of FIG. 24

FIG. 24 illustrates another embodiment of the present invention. This embodiment is one example of forming a tooth profile by further drawing as sizing for finishing, after ejecting the metal intermediate from a die of an intermediate step.

A die 111 for drawing has a bore 111a. The bore 111a penetrates in a direction of a central axis 116. A female tooth profile 114 is formed on a circumferential surface of the bore 111a. Reference numeral 117 designates a pitch circle.

The die 111 for drawing comprises a guide portion 112 and a drawing portion 113.

The guide portion 112 is provided at an opening of the die 111 for drawing. It is preferable to set the pitch circle 117 of the guide part 112 slightly larger in diameter than the pitch circle of the ejected product of the previous step. It is preferably set so as to have 0.05 to 0.2 mm larger, for example. The length of the axial dimension of the guide portion 112 is preferably five times or more than that of the tooth module.

The drawing portion 113 is provided at a lower end of the guide portion 112. The tooth profile 114 of the drawing portion 113 is configured as a normal tooth profile.

When forming a completed tooth profile, an initial step is configured as expansion of the metal, and after that, an ejecting step is performed. Thus, a precise tooth trace is formed. Further, the metal material is inserted into the bore 111a. Then, the metal material is drawn by 0.05 to 0.2 mm in the drawing portion 113 as the ejected tooth profile is configured as a copied surface. Thus, it is possible to drastically reduce deviations of the tooth profiles extremely.

In all embodiments described above, it is preferable to take the processed product out of the die after each of the plural steps of cold forging (at least between stretching and expanding) and to coat with lubricant or soften, thereby allowing forging under a low load.

In addition, in all embodiments described above, it is preferable not to forge to completely fill the die except in the final step. In other words, in each of the plural steps (plural cold forgings), it is preferable to stop forming before the addendum part of the processed product reaches the dedendum part of the die in order to avoid increase in of the forming load.

Embodiment of FIGS. 25 to 28

FIGS. 25 to 28 illustrate another embodiment of the present invention. In this embodiment, stretching and expansion of the metal material are separated into two steps and a sizing (drawing for finishing) step is further combined. Reference numeral 120 designates a gear. Reference numeral 124 designates a pitch circle.

Figure 25:
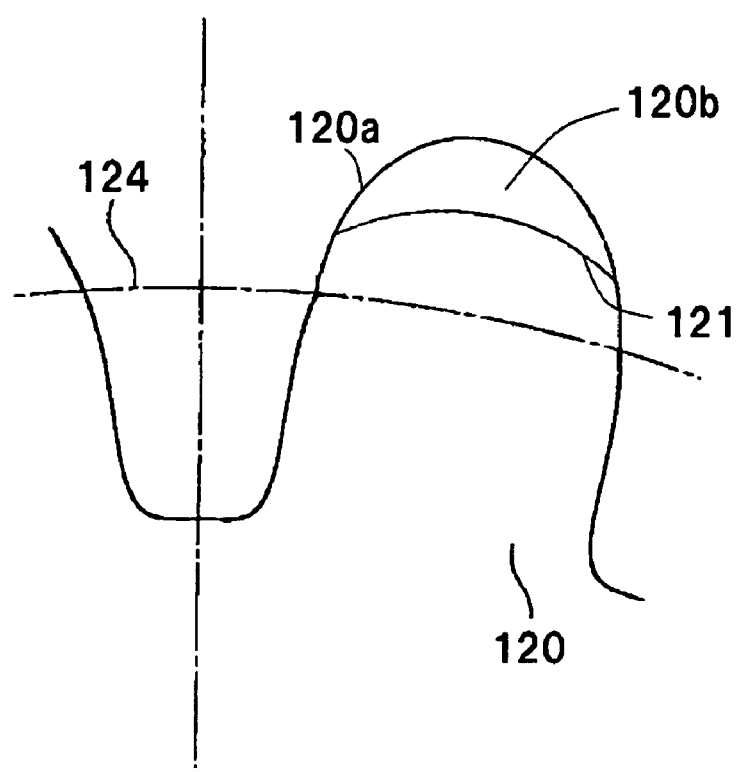
FIG. 25 illustrates the tooth profile 121 obtained in another embodiment of the present invention.

Each step will be described as follows:

In the initial step, a metal material is inserted inside a tooth profile 120a of a predetermined die and stretched. Thus, an initial tooth profile 121 having an addendum part with a large arc shape shown in FIG. 25 is obtained. Now a space having a crescent shape designated by reference numeral 120b remains between an addendum part of the initial tooth profile 121 of the processed product and an addendum part of the tooth profile 120a of the die.

Figure 26:
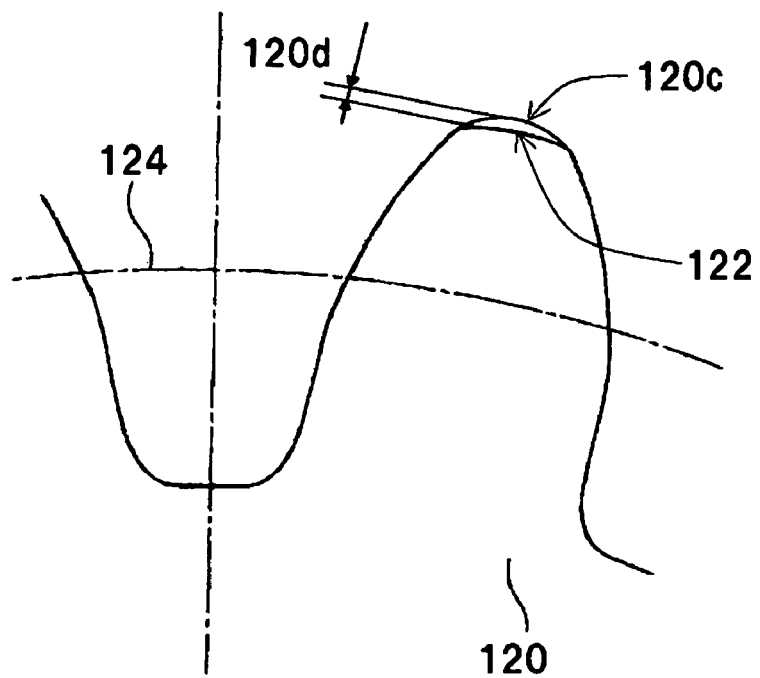
FIG. 26 illustrates the tooth profile 122 obtained in the step following FIG. 25.

In the intermediate step, the initial tooth profile 121 obtained in the initial step is inserted into a die 120c and expanded. The die 120c is different from the die used in the initial step. Thus, the tooth profile 122 shown in FIG. 26 is obtained. Reference numeral 120d designates a sizing margin. In some cases, the tooth profile 122 does not abut the whole profile of the die 120c.

Figure 27:
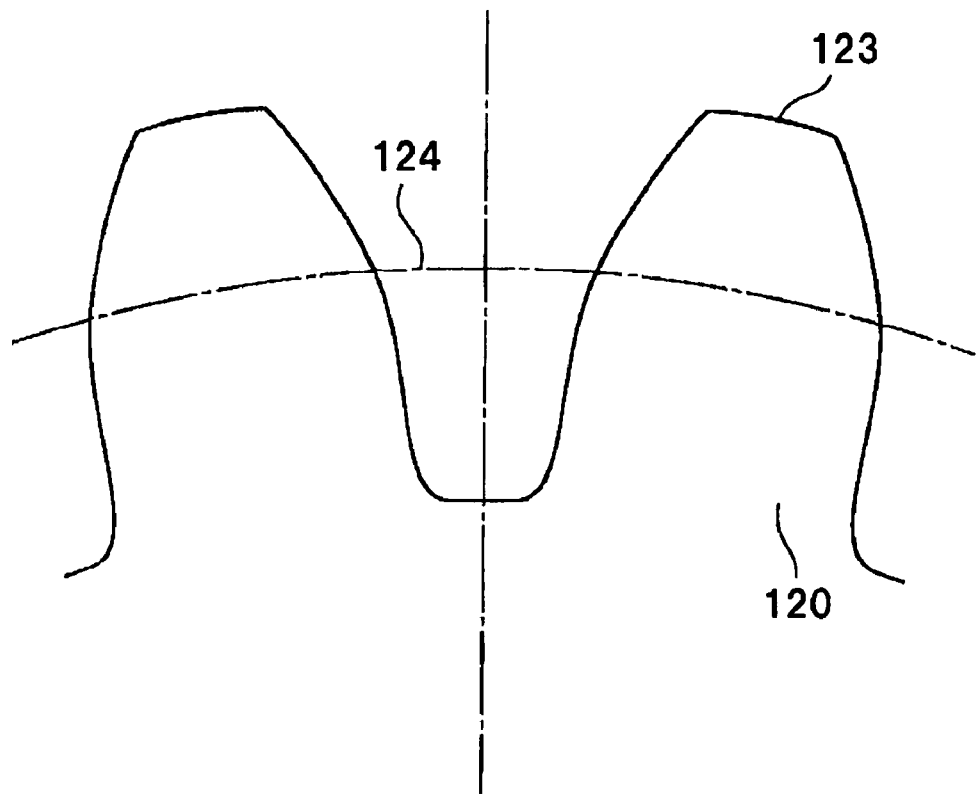
FIG. 27 illustrates the tooth profile 123 obtained in the step of FIG. 26.

In the finishing step, the tooth profile 122 obtained in the intermediate step is sized whereby the completed tooth profile 123 shown in FIG. 27 is obtained.

Figure 28:
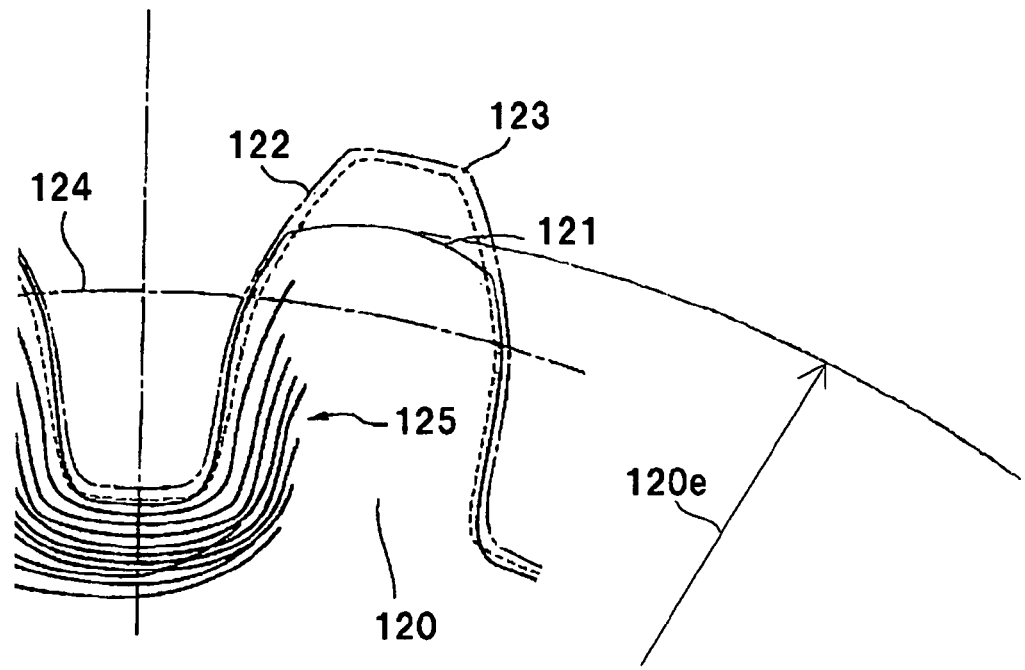
FIG. 28 is a combination of FIGS. 25 to 27.

FIG. 28 shows the combination of FIGS. 25 to 27.

Reference numeral 125 designates fiber flow after the second step. In the tooth profile 123 obtained, the fiber flow 125 is good and has no cracks. In addition, the radius r designated by reference numeral 120e may have wide allowance so long as it is a plus value.

Figure 29:
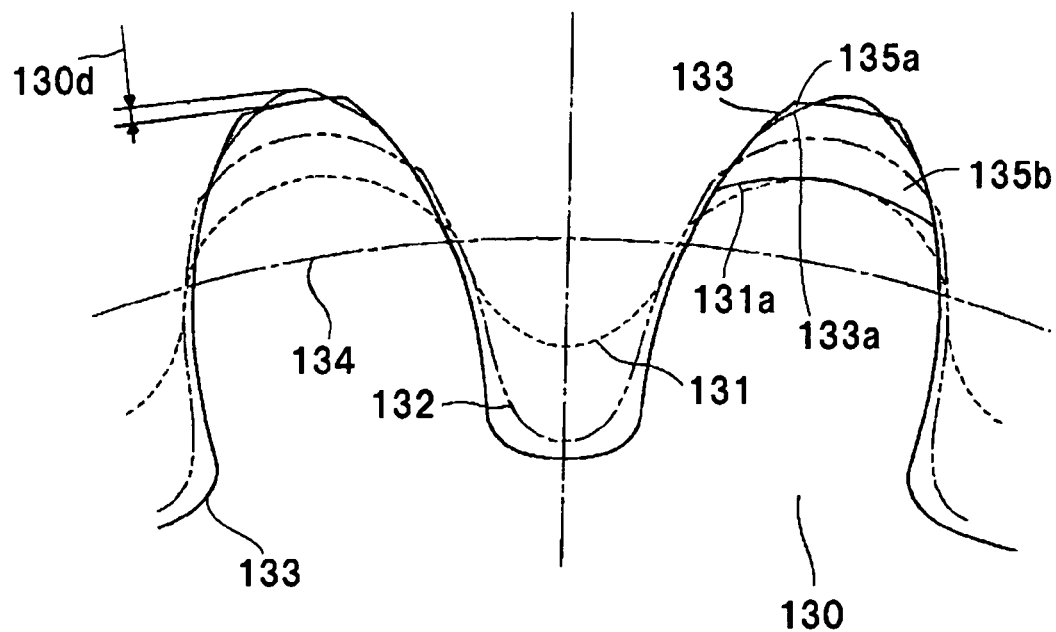
FIG. 29 illustrates another embodiment of the present invention.

Embodiment of FIG. 29

FIG. 29 illustrates another embodiment of the present invention. In this embodiment, stretching and expansion of the metal material are separated into two steps and a sizing (drawing for finishing) step is further combined. Reference numeral 130 designates a gear. Reference numeral 134 designates a pitch circle.

Each step will be described as follows:

In the initial step, a metal preform is inserted into a die and stretched. Thus, an initial tooth profile 131 having an addendum part with a large radius arc shape is obtained.

In the intermediate step, the initial tooth profile 131 obtained in the initial step is inserted into a die (not shown) different from the die used in the initial step and is ejected. Thereby a tooth profile 132 having an addendum part with a large arc shape is obtained.

In the finishing step, the tooth profile 132 obtained in the intermediate step is sized whereby a tooth profile 133 is obtained. Reference numeral 130d designates a sizing margin.

Reference numerals 131a, 133a designate tooth shapes of processed products. Spaces designated by reference numerals 135a, 135b remain inside the die. A tip part of the addendum part of the tooth profile formed by ejecting is formed so as not to make contact with an addendum part of the tooth profile of the die. Since the tooth profile 133a has no small angle R, strength against rupture (cracking) of the die is improved. The shape of the tip of the addendum part of the tooth profile formed by ejecting is not limited to an arc. It can be a round shape or other free shape.

The present invention is not limited to the embodiments described above. The present invention is not limited to a mode of enclosed forging and includes a mode of non-enclosed forging.

What is claimed is:

1. A method of manufacturing a gear, by cold-forging, a gear having a finished gear tooth profile, comprising the steps of:

in an initial cold-forging step, cold-forming a preform to produce a gear element having a first gear tooth profile of a first tooth thickness;

in an intermediate cold-forging step forming a gear element of a second tooth profile, following the initial cold-forging step, using a die having a surface with a die tooth profile extending from an opening at one end to a second end, opposite the one end, pressing the gear element with a punch or pin into the opening of the die and axially along the surface with the die tooth profile, whereby, before the gear element reaches the second end, without a reduction in the tooth thickness of more than 10% of the first thickness, a dedendum portion of the gear element including bottom lands of the tooth profile is pressed radially inward and an addendum portion of the gear element is caused to expand radially outward, wherein when the gear element reaches the second end (1) tooth thickness of the teeth of the second tooth profile remains substantially identical to the first tooth thickness or the tooth thickness of teeth in the second tooth profile is reduced no more than 10% of the first tooth thickness and (2) spaces remain between the outer tips of the teeth of the second tooth profile of the expanded addendum portion and the die tooth profile; and a sizing step, following the intermediate step, wherein the gear element is finished to have the finished gear tooth profile.

2. The method as defined in claim 1 the intermediate step is repeated, each time using a different die whereby the tooth profile of the gear element is brought incrementally closer to the finished gear tooth profile.

3. The method as defined in claim 2, wherein round portions on both sides of a dedendum part of the initial tooth profile are larger than round portions on both sides of a dedendum part of the finished gear tooth profile.

4. The method as defined in claim 2 wherein the tooth thickness of the teeth of the second tooth profile remains substantially identical to the first tooth thickness after the intermediate cold-forging step.

5. The method as defined in claim 1 wherein the tooth thickness of the teeth of the second tooth profile remains substantially identical to the first tooth thickness after the intermediate cold-forging step.

6. The method as defined in claim 1 additionally comprising coating the gear element having a first gear tooth profile with a lubricant prior to the intermediate cold-forging step.

7. The method as defined in claim 1 wherein the sizing step is a cold-forging step that reduces the tooth thickness by an amount within the range of 0.02 to 0.1 mm.

8. The method as defined in claim 2 wherein the sizing step is a cold-forging step that reduces the tooth thickness by an amount within the range of 0.02 to 0.1 mm.

9. The method as defined in claim 3 wherein the sizing step is a cold-forging step that reduces the tooth thickness by an amount within the range of 0.02 to 0.1 mm.

10. The method as defined in claim 4 wherein the sizing step is a cold-forging step that reduces the tooth thickness by an amount within the range of 0.02 to 0.1 mm.

11. The method as defined in claim 5 wherein the sizing step is a cold-forging step that reduces the tooth thickness by an amount within the range of 0.02 to 0.1 mm.

12. The method as defined in claim 6 wherein the sizing step is a cold-forging step that reduces the tooth thickness by an amount within the range of 0.02 to 0.1 mm.

* * * * *

UNITED STATES PATENT AND TRADEMARK OFFICE
CERTIFICATE OF CORRECTION

PATENT NO. : 7,677,073 B2
APPLICATION NO. : 10/592486
DATED : March 16, 2010
INVENTOR(S) : Keiji Tanabe It is certified that error appears in the above-identified patent and that said Letters Patent is hereby corrected as shown below:

Title page, item [57] Abstract:
Line 5, "intermediate step" should read -- intermediate step in which --.

Column 18, Line 29 (claim 2, line 1) "claim 1" should read -- claim 1 wherein --.

Signed and Sealed this

Twenty-fifth Day of May, 2010

David J. Kappos
*Director of the United States Patent and Trademark Office*